(12) United States Patent
Smith

(10) Patent No.: US 7,464,064 B1
(45) Date of Patent: *Dec. 9, 2008

(54) CONFIGURATION MODEL CONSISTENCY CHECKING USING FLEXIBLE RULE SPACE SUBSETS

(75) Inventor: Shawn A. P. Smith, Austin, TX (US)

(73) Assignee: Versata Development Group, Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 11/695,247

(22) Filed: Apr. 2, 2007

Related U.S. Application Data

(62) Division of application No. 10/404,891, filed on Mar. 31, 2003, now Pat. No. 7,200,582.

(51) Int. Cl.
*G06F 17/00* (2006.01)
*G06N 5/02* (2006.01)

(52) U.S. Cl. .............................. 706/47; 706/46; 706/14
(58) Field of Classification Search .................. 706/47, 706/46, 14
See application file for complete search history.

(56) References Cited

OTHER PUBLICATIONS

Faruk Polat et al., UVT: Unification-Based Tool for Knowledge Base Verification, 1993, IEEE, 69-75.*
Musa Jafar et al., Interactive Verification of Knowledge-Based Systems, 1993, IEEE, 25-32.*
Derek L. Nazareth, Investigating the Applicability of Petri Nets for Rule-Based System Verification, IEEE, 1993, 402-415.*
Timothy J. O'Leary et al., Validating Expert Systems, 1990, IEEE, 51-58.*
Alun D. Preece et al., Verifying and Testing Expert System Conceptual Models, 1992, IEEE, 922-927.*
Polat, Faruk et al., "UVT: A Unification-Based Tool for Knowledge Base Verification, Validation and Verification of Knowledge-Based Systems," Jun. 1993, IEEE Computer Society Press, pp. 69-75.

* cited by examiner

*Primary Examiner*—Joseph P Hirl
(74) *Attorney, Agent, or Firm*—Hamilton & Terrile, LLP; Kent B. Chambers

(57) ABSTRACT

Inconsistencies between configuration rules represent a significant concern when modeling a product using configuration rules. The consistency checking system approaches a configuration model from the perspective of a sets of features and families. The configuration space of a model represents the entire set of all combinations of selections within a configuration model. The consistency checking system operates on subsets of the configuration space by consolidating data within the configuration space into minimized subsets that represent a portion of the configuration space where a particular consistency error can occur. Thus, the contents of each subset vary depending upon which consistency error is being checked, and consistency checking is performed on reduced subsets determined on an error by error basis rather than on the configuration space as a whole.

27 Claims, 26 Drawing Sheets

```
                    RULES
    Feature Optionality    Constraint
    F1           S         A1, B1, C1, D1, E1
    F1           O         A1, B1, C1, D1, E2
    F2           M         A1, B1, C1, D1, E1
    F2           O         A1, B1, C1, D1, E3
    F2           O         A1, B1, C1, D2, E1
    F2           O         A1, B1, C1, D2, E2
    F3           O         A1, B1, C1, D2, E1
    F3           O         A1, B1, C1, D2, E2
    F4           O         A1, B1, C1, D2, E1
    F4           O         A1, B1, C1, D2, E2
                    ⋮          ⋮
```

*Figure 1 (prior art)*

|    | A1 B1 C1 D1 E1 | A1 B1 C1 D1 E2 | A1 B1 C1 D1 E3 | A1 B1 C1 D2 E1 | A1 B1 C1 D1 E2 | ... |
|----|---|---|---|---|---|---|
| F1 | S | O |   |   |   |   |
| F2 | M |   | O | O | O |   |
| F3 |   |   |   | O | O |   |
| F4 |   |   |   | O | O |   |

*Figure 2A (prior art)*

|    | A1 B1 C1 D1 E1 | A1 B1 C1 D1 E2 | A1 B1 C1 D1 E3 | A1 B1 C1 D2 E1 | A1 B1 C1 D2 E2 | ... |
|----|---|---|---|---|---|---|
| F1 | S | O |   |   |   |   |
| F2 | M |   | O | O | O |   |
| F3 |   |   |   | O | O |   |
| F4 |   |   |   | O | O |   |

*Figure 2B (prior art)*

|    | A1<br>B1<br>C1<br>D1<br>E1 | A1<br>B1<br>C1<br>D1<br>E2 | A1<br>B1<br>C1<br>D1<br>E3 | A1<br>B1<br>C1<br>D2<br>E1 | A1<br>B1<br>C1<br>D1<br>E2 | ... |
|----|----|----|----|----|----|----|
| F1 | S | O |   |   |   |   |
| F2 | M |   | O | O | O |   |
| F3 |   |   |   | O | O |   |
| F4 |   |   |   | O | O |   |

*Figure 3*

Rules

| Feature | Optionality | Constraint |
|---|---|---|
| EN1 | O | ALL |
| EN2 | S | ALL |
| | | |
| TR1 | S | EN1 |
| TR2 | S | EN2 |
| TR2 | O | EN1 |
| | | |
| AX1 | S | EN1 |
| AX2 | S | EN1.TR2 |
| AX2 | O | EN2.TR2 |
| AX2 | R | EN2 |
| AX3 | O | TR2.EN2 |

*Figure 9*

| Main Family | EN1 | | EN2 | |
|---|---|---|---|---|
| | TR1 | TR2 | TR1 | TR2 |
| AX1 | S | S | | |
| AX2 | | S | | O |
| AX2 | | | R | R |
| AX3 | | | | O |

*Figure 10*

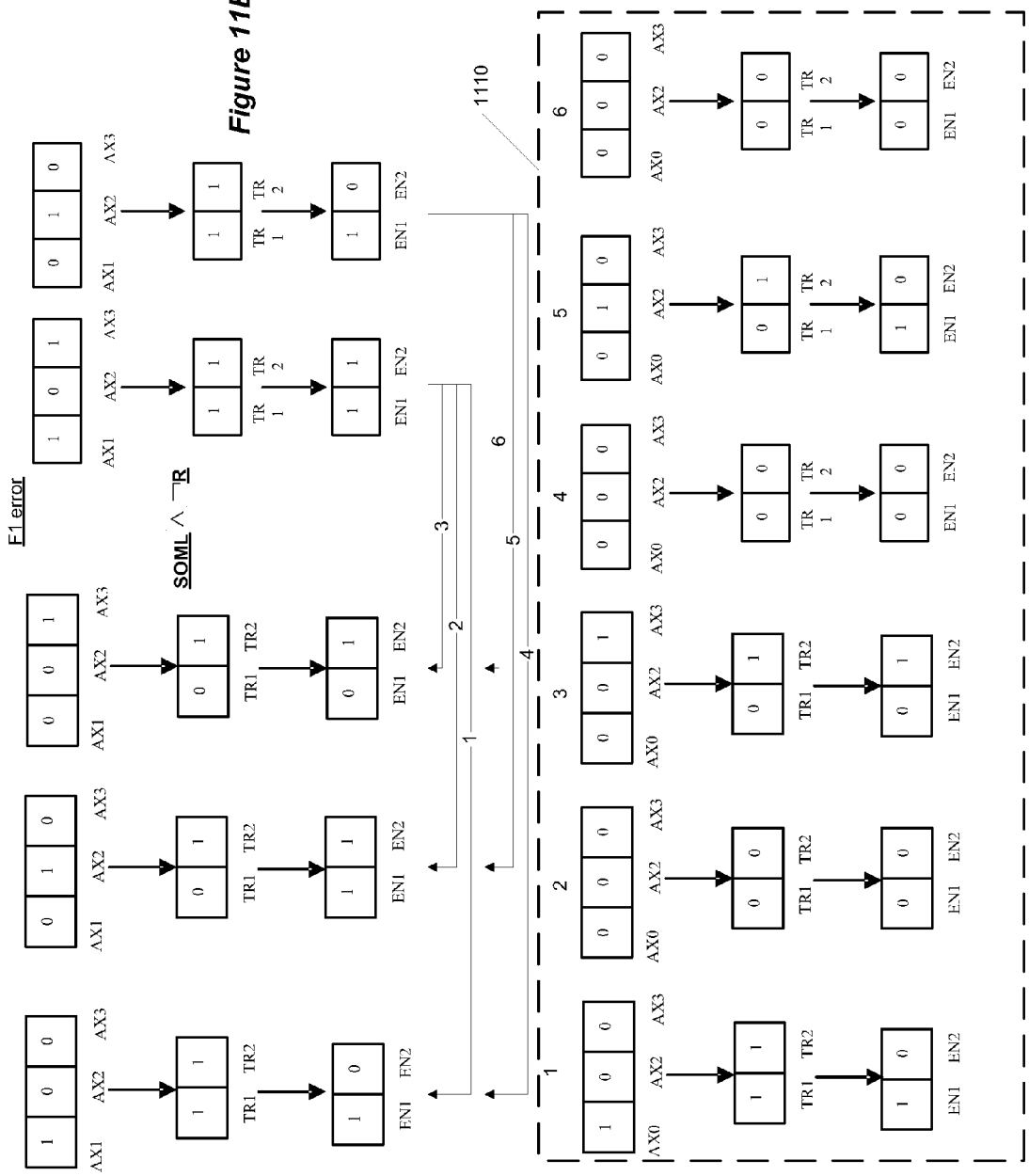

Rules

<u>Feature Optionality Constraint</u>
| | | |
|---|---|---|
| EN1 | O | ALL |
| EN2 | S | ALL |
| | | |
| TR1 | S | EN1 |
| TR2 | S | EN2 |
| TR2 | O | EN1 |
| | | |
| AX1 | S | EN1 |
| AX1 | M | EN2.TR2 |
| AX2 | S | EN1.TR2 |
| AX2 | O | EN2.TR2 |
| AX2 | R | EN2 |
| AX3 | O | TR2.EN2 |

*Figure 15*

| Main Family | EN1 | | EN2 | |
|---|---|---|---|---|
| | TR1 | TR2 | TR1 | TR2 |
| AX1 | S | S | | M |
| AX2 | | S | | O |
| AX2 | | | R | R |
| AX3 | | | | O |

CONFIGURATION MODEL CONSISTENCY CHECKING USING FLEXIBLE RULE SPACE SUBSETS

This application is a divisional of application Ser. No. 10/404,891, filed Mar. 31, 2003, now U.S. Pat. No. 7,200,582 which is incorporated herein by reference in its entirety.

BACKGROUND OF THE INVENTION

1. Field of the Invention

The present invention relates in general to the field of information processing, and more specifically to a system and method for checking consistency of configuration models against predetermined rules and assumptions using flexible rule space subsets.

2. Description of the Related Art

A configurable product can be described by a configuration model having a set of configuration rules. A configurable product can be conceptually broken down into sets of selectable families and features of families that make up each product. A family represents a classification of a particular type of feature. Families are typically classified as groups of features with the same functional purpose. Example families for an automobile are "engines," "tires," "seats," and "exterior paint color." Families can be represented in terms of the minimum and maximum number of features that must be present in a configuration from a family for the configuration to be valid. A common family minimum and maximum or "(min, max)" is (1, 1). This notation means that exactly one feature from the family must be part of a configuration for the configuration to be valid. Other common (min, max) settings are (0, 1), meaning that either no features or a single feature from the family must be present in a configuration for it to be valid, and (0, −1), meaning that zero or any positive number of features from the family must be present in a configuration for it to be valid.

A feature represents an option that can be ordered on a product. All features are members of a family. Features are both assigned optionalities and used to qualify other features and the optionalities assigned to them. An example feature from the engine family is a "4.8 liter V8." Features relate to each other via ordering codes or optionalities. Example optionalities include "S", "O", "M", and "N." which translate to standard, optional, mandatory, and not available. A specific example would be "the 4.8 liter V8 engine is standard on the GS trim."

A configuration rule includes a main feature, an optionality, one or more constraints, and an applicable timeframe. As an example:

| Main feature | Optionality | Constraints | Timeframe | |
|---|---|---|---|---|
| 4.8 liter V8 | S | XL & US | May-December 2003 | Rule 1 |

Rule 1 means "the 4.8 liter V8 is standard with the XL trim and US market from May to December 2003." The main feature represents the feature that is being affected by the rule. Optionalities can be positive or negative: positive optionalities state that the main feature can work with the constraints; negative optionalities state the main feature cannot work with the constraints. Constraints qualify the rule and can be an arbitrary Boolean expression of features such as AND, NOT, and OR operators. The timeframe specifies when the other rule elements are effective.

A configuration buildable describes what features can and can't exist with other features of a product. The example rule above defines a buildable configuration in the following way: "the 4.8 liter V8 is buildable (because it is standard) with the combination of XL and US." If the combination of features, such as of XL and US, is not buildable, the example rule is inactive. Consequently, even though the engine is buildable with that combination, if the combination is not buildable, the three features together are not a buildable configuration. A rule that would make the example rule inactive is the following:

| Main feature | Optionality | Constraints | Timeframe | |
|---|---|---|---|---|
| XL | N | US | September 2002 | Rule 2 |

Rule 2 means "the XL trim main feature is not available with US from September of 2002 onward." Until the XL main feature is made available with the US by changing the optionality from "N" to one that expresses a positive relationship, there will not be a buildable configuration for XL, US, and the 4.8 L engine.

Thus, a rule defines a buildable configuration between its main feature and its constraints only. A rule does NOT define a buildable configuration relationship between the members of its constraints. A separate rule must define that buildable configuration. Consequently, all rules together for a product define the complete product buildable configurations. In order to determine if the three features in the example rule (the main feature and the constraints) are a buildable configuration, the rules written on each of those features (i.e. where each feature is the main feature) need to be considered jointly. Inactive rules do not define buildable configurations until they become active.

Inconsistencies between rules represent a significant concern when modeling a product using rules. Inconsistencies among rules in configuration models result in errors that negatively impact the usability of a configuration model. Inconsistencies can occur due to modeling mistakes or due to multiple parties generating rules for the same configuration model. Thus, detecting inconsistency errors through consistency checking plays an important role in developing useable, robust configuration models. For example:

| Main feature | Optionality | Constraints | Timeframe | |
|---|---|---|---|---|
| XL | N | US | September 2003 | Rule 3 |
| XL | S | US | September 2003 | Rule 4 |

Rule 3 and Rule 4 are inconsistent because Rule 3 signifies that the feature XL is not available in the U.S. market, and Rule 4 signifies that the feature XL is standard in the U.S. market. As the number of rules grows, the ability to detect inconsistencies becomes more challenging.

FIG. 1 depicts a set of rules 100 with features F1-F4 of a single family, optionalities, and constraints represented by families A, B, C, D, E (each having "X" number of features). FIGS. 2 and 3 depict the rules of FIG. 1 in respective grids 200 and 202 and illustrate two conventional ways of detecting inconsistencies between rules. In FIG. 2A, each cell in a column is compared against every other cell in a column. An inconsistency error exists if two cells with a column have inconsistent optionalities or other assumptions are violated, such as a lack of a standard configuration in a column. Some configurable products have tens of thousands or hundreds of thousands of rules defining buildable configurations. As the number of rules and, thus, columns in the grid of FIG. 2A grow, column by column inconsistency checking becomes very computationally time consuming.

FIG. 2B depicts a variation on the column-by-column consistency checking approach of FIG. 2A. In FIG. 2B columns with identical optionalities are grouped together. Thus, the number of consistency checking operations is reduced; however, this can still result in long periods of computational processing.

SUMMARY OF THE INVENTION

In one embodiment of the present invention, a method of detecting multiple consistency error types between configuration rules, wherein each consistency error is represented by a set equation, includes, for each consistency error, identifying one or more sets of feature combinations in accordance with the set equation of the consistency error. The method further includes detecting the consistency error using the one or more identified sets of feature combinations and the set equation associated with the consistency error.

In another embodiment of the present invention, a consistency checking system for detecting multiple consistency error types between configuration rules, wherein each consistency error is represented by a set equation, the system including a processor and a memory coupled to the processor. The memory having instructions executable by the processor that for each consistency error identifies one or more sets of feature combinations in accordance with the set equation of the consistency error and detects the consistency error using the one or more identified sets of feature combinations and the set equation associated with the consistency error.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 1 (prior art) depicts a set of configuration rules having features, optionalities, and constraints.

FIG. 2A (prior art) depicts a column-by-column approach to rule consistency checking.

FIG. 2B (prior art) depicts a consolidation of identical columns followed by a column-by-column approach to rule consistency checking.

FIG. 3 depicts a grid with features grouped in accordance with particular consistency checking error operations.

FIG. 9 depicts a grid containing the rules of FIG. 8.

FIG. 10 depicts a configuration space with multiple subsets.

FIGS. 11A, 11B, 11C, and 11D depict a use of trie data structures and set routines to determine a missing optionality consistency error within a subset of a configuration space.

FIG. 15 depicts example configuration rules to illustrate consistency checking operations of the consistency checking system of FIG. 4 when determining a consistency error that occurs when mandatory or legal optionalities conflict with an "optional" optionality.

FIG. 16 depicts a grid containing the rules of FIG. 15.

DETAILED DESCRIPTION

Figures 4, 5:
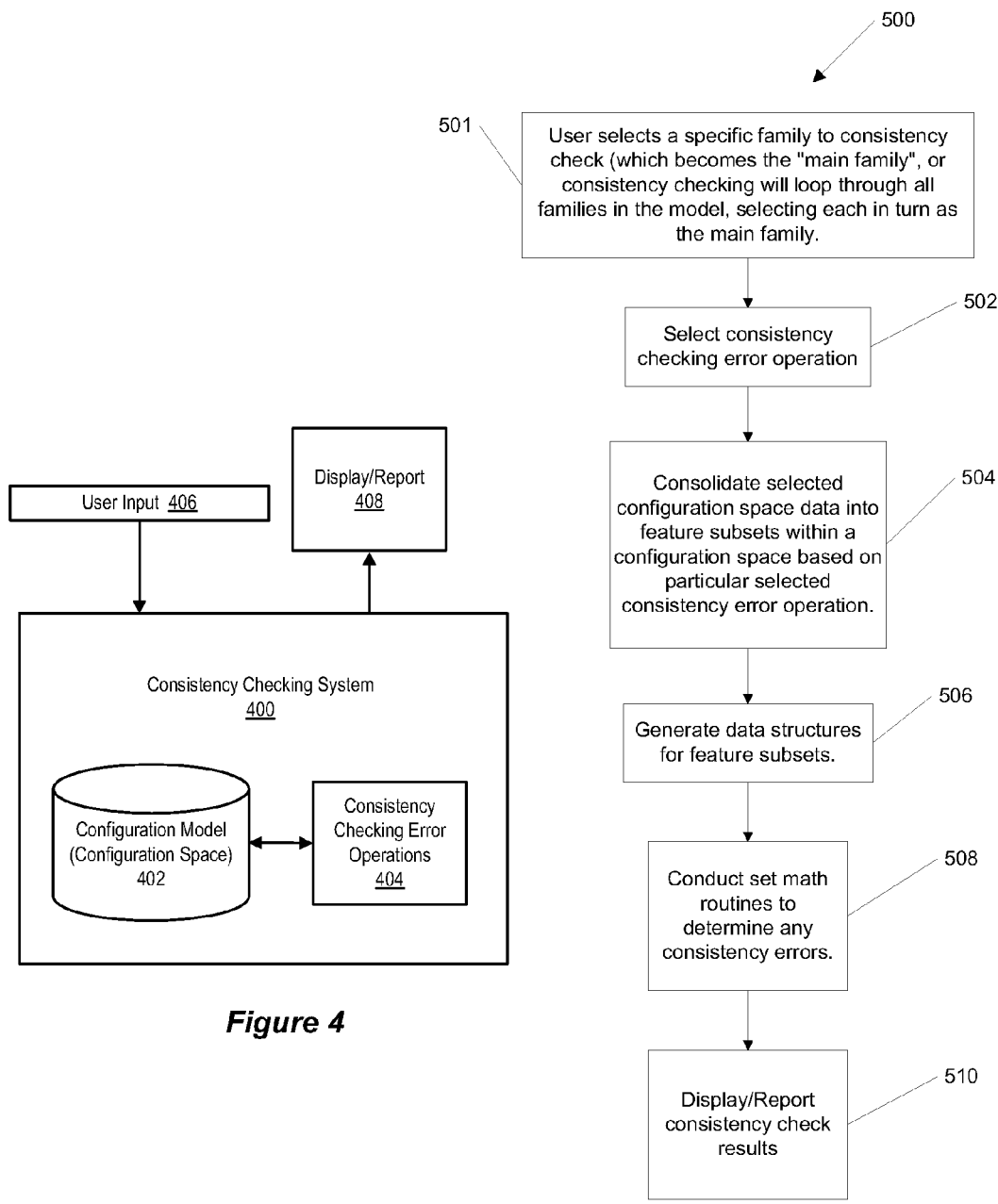
FIG. 4 depicts a consistency checking system.
FIG. 5 depicts an operational flow chart for the consistency checking system of FIG. 4.

Although the present invention has been described in detail, it should be understood that various changes, substitutions and alterations can be made hereto without departing from the spirit and scope of the invention as defined by the appended claims.

As stated above, inconsistencies between rules represent a significant concern when modeling a product using rules. The amount of time and processing resources used to perform consistency checking also represents a significant concern. Long processing times for consistency checks introduce a number of problems, such as detrimental postponement of consistency checks, reluctance to make changes to a configuration model, and work force inefficiencies. Embodiments of the consistency checking system described herein improve consistency checking performance, especially when performing consistency checks on large configuration models, i.e. configuration models having a large number of rules.

The consistency checking system approaches a configuration model from the perspective of sets of features and families. The configuration space of a model represents the entire set of all combinations of selections within a configuration model. The consistency checking system operates on subsets of the configuration space by consolidating data within the configuration space into minimized subsets that represent a portion of the configuration space where a particular consistency error can occur. Thus, the contents of each subset vary depending upon which consistency error is being checked, and consistency checking is performed on reduced subsets determined on an error by error basis rather than on the configuration space as a whole.

One difficulty that has been overcome by embodiments of the consistency checking system described herein is the identification of individual consistency errors and the ability to identify the subsets of the configuration space where such consistency errors can occur.

Following are four examples of consistency error types that utilize subsets of the configuration space to efficiently identify associated consistency errors. The particular subsets and example data structure representation and set operations are described in more detail below. Arbitrary labels are applied to each consistency error type for reference purposes.

(a) Error "F1" no usage rule of any optionality for a particular configuration of families and features.
(b) Error "F2 (a)"—a usage rule is present, but a standard optionality is required and no standard optionality is present.
(c) Error "F2 (b)"—multiple standards.
(d) Error "F2 (c)"—mandatory and legal optionalities conflict with an "optional" optionality.

Another difficulty overcome by the consistency checking system relates to identifying and refining a data structure to represent such subsets and determining the 'mathematical set operations' applied to the data structure in a data processing system that provide identification of consistency errors. A trie data structure effectively represents the configuration subsets, and data processing systems can efficiently conduct set operations on the trie data structures.

FIG. 3 depicts an example grid that reflects the consolidation of features and columns in the grid into subsets. For example, the F1 consistency error operates on the set of features having standard, mandatory, optional, and legally required optionalities less restrictions. The F2(a) consistency error operates on a first set of features having 'optional' optionalities and a second set of features having standard, mandatory, and legally required optionalities. The F2(c) consistency error operates on a first of features having mandatory and legally required optionalities and a second set of features having 'optional' optionalities. These sets can be further refined as described below to account for restricted configurations and other contingencies.

FIG. 4 depicts consistency checking system 400, which includes a model having the configuration rules that define the configuration space of one or more products. The consistency checking system 400 also includes a consistency checking error operations module 404 that includes consistency error definitions and operations to generate configuration subsets based on a particular consistency error being checked, associated data structure generation, and set operation formulae to detect consistency errors in configuration model 402. Consistency checking system 400 initiates selected consistency checking operations in accordance with user input 406. User input 406 represents, for example, user entered requests through a data entry mechanism and/or preprogrammed operation instructions for consistency checking system 400. The consistency checking system 400 generates a display or other type of report of results of the consistency checking operations performed by consistency checking system 400.

FIG. 5 depicts an operational flow chart of consistency checking operations 500 for consistency checking system 400. In operation 501 a user selects a specific family to consistency check (which becomes the "main family", or consistency checking will loop through all families in the model, selecting each in turn as the main family. In operation 502 a user selects a consistency checking error operation. The selection could be a manual entry or an automated entry, and can select specific consistency error operations, all consistency error operations, or any combination of consistency error operations. Operation 504 consolidates selected configuration space data into feature subsets based on particular selected consistency error operation. Operation 506 populates data structures with the feature subsets in preparation for conducting set math routines in operation 508 to determine any consistency errors in the configuration space. Operation 510 displays or otherwise reports the results of operation 508. The consistency checking operations 500 can be repeated as often as desired, such as after a configuration model is revised or additional consistency error checks are desired.

The consistency checking system 400 uses a trie data structure in one embodiment to represent subsets of configuration data. An overview of the trie data structure follows to facilitate understanding of the set operations conducted by consistency checking operations 500.

Figure 6A:
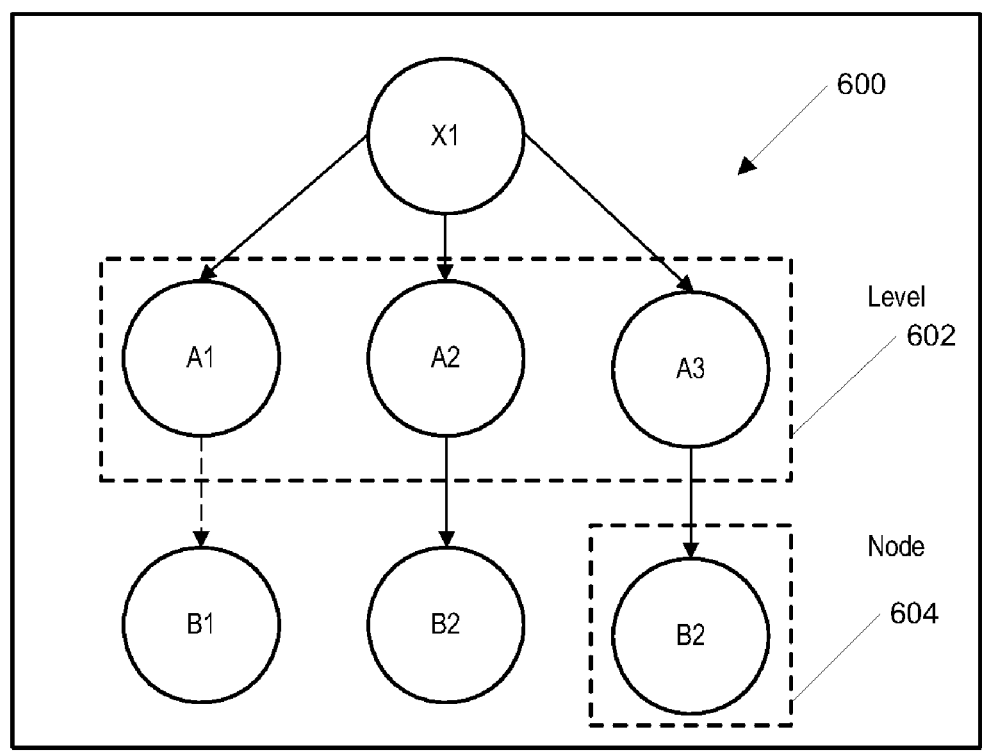
FIG. 6A depicts an example trie data structure.

Referring to FIG. 6A, a trie data structure 600, or trie, extends the typical ordered binary decision diagram data structure. The ordered binary decision diagram is a directed acyclic graph (DAG) data structure with nodes connected by edges. Nodes are organized into levels, where each level represents a single binary variable. The levels are ordered in a known manner. Each edge that starts at a node in level "i" ends at a node in level "j" such that "i<j" according to the ordering of the levels. The outgoing edges from each node are labeled with values that represent the value of the variable at the originating node (either 1 or 0). Every path through the DAG ends at one of two special nodes, labeled "0" and "1." The ordered binary decision tree can be used to evaluate whether a particular conclusion can be reached based on whether a path through the DAG that matches certain provided input criteria (typically, one or several of the variables with an assigned binary value) ends at the special node "0" or "1".

Whereas the ordered binary decision diagram assigns a binary variable to a level and a binary value to an edge, the trie data structure 600 assigns a multi-valued variable to a level and a set of binary values to each node. Whereas the ordered binary decision diagram explicitly includes special nodes "0" and "1", the trie data structure 600 does not, and only edges that belong to paths that would end at node "1" are included. In one embodiment such as an automotive configuration space context, the trie has special meaning: each level 602 of the trie is a family, the nodes 604 of the level are sets of features within this family, each feature (i.e. member of the set X1, A1, A2, A3, B1, and B2) can assume a binary value, and the trie 600 as a whole represents the constraint features of rules associated via an optionality with a main feature.

The trie data structure 600 represents the value of the variable at each node through the values of the features in the set at that node. The value of the variable at each node and through all levels of the trie 600 communicates the value of the trie 600. Trie 600 represents the following configurations: {X1, A1, B1},{X1, A2, B2}, {X1, A3, B2}

These buildable configurations are expressed by the following example configuration rules:

| Main feature | Optionality | Constraints |
|---|---|---|
| X1 | O | all |
| A1 | O | X1 |
| A2 | O | X1 |
| A3 | O | X1 |
| B1 | O | A1 |
| B2 | O | A2 |
| B2 | O | A3 |

Figure 6B:
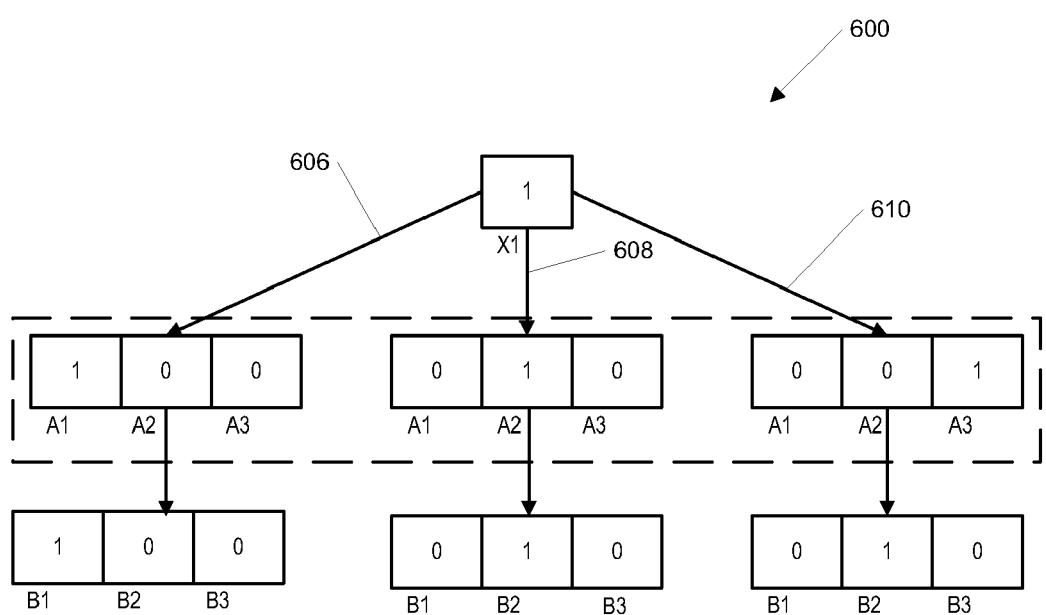
FIG. 6B depicts a binary form of the trie data structure of FIG. 6A.

Referring to FIGS. 6A, 6B, and 7, in one embodiment, the binary form of trie 600 uses one bit per feature. A known family and feature ordering of the bits, a known number of bits per family, and a value of each bit can completely define each trie 600. For example, FIG. 6B depicts trie 600 in its binary form. Since family X has only one feature, it is represented by a single bit, with 1=present and 0=absent. Family A has 3 features, A1, A2, and A3. Thus, branch 706 is represented by the binary sequence 1100100, with the most significant bit representing the X family, the next 3 most significant bits representing the A family, and the 3 least significant bits representing the B family. Accordingly, branch 708 is represented by the binary sequence 1010010, and branch 710 is represented by the binary sequence 1001010. It will be evident to those of ordinary skill in the art that other coding schemes may be used to define a trie.

In one embodiment, through all trie operations (complement, intersect, union, subtract, etc.), the trie DAGs are kept minimized using the following rules: (1) multiple identical leaf nodes are consolidated into a single leaf node with multiple parents, (2) multiple identical interior nodes with identical sets of child nodes are consolidated into a single interior node with multiple parents, and (3) sibling nodes (nodes with the same parent) with identical sets of child nodes are consolidated into a single node. Building tries using these rules provides a significant reduction in memory requirements and computation time.

Figure 7A:
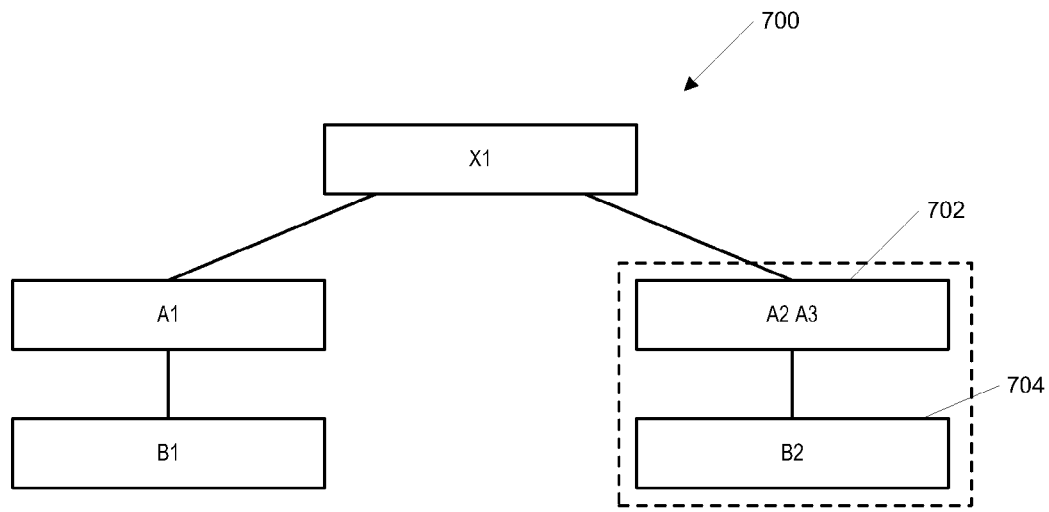
FIGS. 7A, 7B, and 7C depict trie minimization operations applied to the trie data structure of FIGS. 6A and 6B.

Applying the minimization process to trie 600, first minimization rule can be applied to B2 nodes, yielding trie 700. In our example, the independent nodes {A2} and {A3} and paths {A2}-{B2} and {A3}-{B2} became a consolidated node {A2,A3} 702 and a reduced path {A2,A3}-{B2} 704 as depicted in FIG. 7A.

Figure 7B:
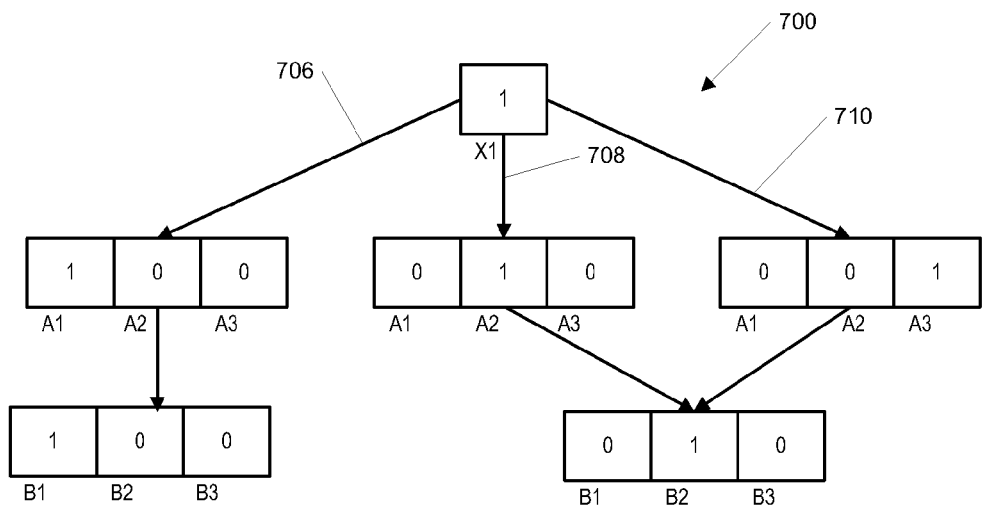

In one embodiment the minimization operation compares corresponding bits in each sub-branch of trie 600's binary form beginning with siblings of the first level and proceeding downward through the levels until the leaf level is reached. For example, the first level in trie 600 corresponds to the A family, thus, the binary forms of the sub-branches of each feature in the A family are compared. The A1 sub-branch is 100, the A2 sub-branch is 010, and the A3 sub-branch is 010. The A2 and A3 sub-branches are identical, thus A2 and A3 are combined as depicted in FIG. 7A. FIG. 7B depicts the binary form of trie 700.

Figure 7C:
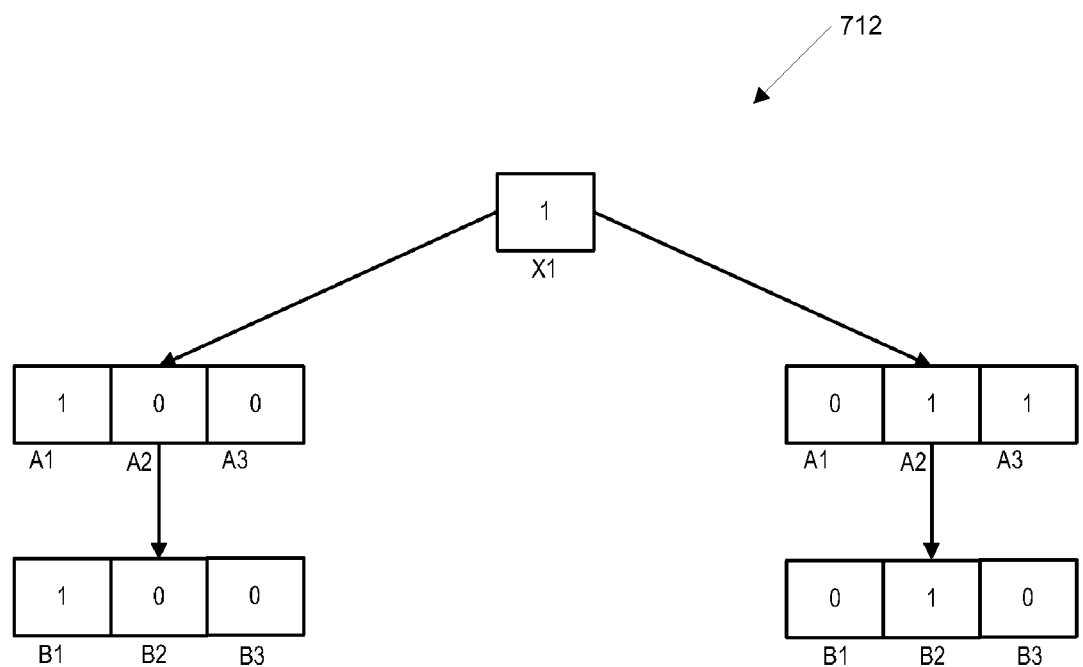

The third trie minimization rule can apply to nodes A2 and A3 which have the same parent (X1) and the same children (B2) resulting in trie 712 of FIG. 7C in a minimized form with associated binary values.

The consistency checking system 400 can be used to determine numerous types of consistency errors that can occur among configuration rules in a configuration model. The four previously specified consistency errors are repeated below with an identification of subsets used to determine consistency errors and subset routines used by consistency checking system 400 to determine consistency errors.

(a) Error "F1" no usage rule of any optionality for a particular configuration of families and features.

[F1]=–[SOML-R]. Note, if "release-not-required" rules exist, a [NR] trie representing not released rules can be subtracted from [F1] to refine the resulting consistency error by excluding any consistency errors associated with configuration rules that are not required to be present as of the time of the consistency check.

(b) Error "F2 (a)"—a usage rule is present, a standard optionality is required, and no standard optionality is present.

[F2a]=([O-R]-[SML-R]). Note, if "no-standard-required rules exist" then an [RS] trie containing the complement of all no standard required rules can be subtracted from [F2a].

(c) Error "F2 (b)"—multiple standards.

Consistency error F2b identifies "multiple standards" by identifying S, M, L subsets for one feature that overlaps with S, M, L subsets for another feature in the same family. Sort the S, M, L rules into groups by their main feature. For each main feature, create a buildability trie "featureSML" with all the S/M/L rules for that main feature, and create a buildability trie "featureR" with all the R rules for that main feature. Then execute the algorithm depicted in FIG. 13. Note a [NR] trie representing not released rules can be subtracted from [F2b] to refine the resulting consistency error by excluding any consistency errors associated with configuration rules that are not required to be present as of the time of the consistency check.

(d) Error "F2 (c)"—mandatory/legal optionalities conflict with an "optional" optionality.

Consistency error F2c identifies M, L overlaps with O. [F2c]=([ML-R]^[O-R]). Note a [NR] trie representing not released rules can be subtracted from [F2c] to refine the resulting consistency error by excluding any consistency errors associated with configuration rules that are not released as of the time of the consistency check. The [F2b] trie can also be subtracted from [F2c] to eliminate replication of consistency errors.

Brackets "[ ... ]" indicate that subset features of the main family are consolidated into a single subset. "Error [F1]=–[SOML-R] is interpreted as follows. "[SOML-R]" represents the subset of main family rules that contain optionalities S, O, M, or L minus the subset of main family rules that contain an optionality R. A "usage rule" indicates that the content of a rule includes an optionality. Example optionalities include:

L=legally required;

M=mandatory;

NR=not released;

O=optional;

R=restricted; and

S=standard.

Equations for consistency errors may be modified if specific types of rules are not present in a system. For example, if M or L rules are not present, simply remove them from each of the consistency error equations. If R rules are not present, simply remove them from each of the consistency error equations. Additionally, if rules are added, they can be added to the equations. For example, if L and R rules are not present, consistency error F1, F2a, and F2c equations become:

$$F1=-[SOM];$$

$$F2a=[O]-[SM]; \text{ and}$$

$$F2c=[M]^\wedge[O].$$

Figure 8:
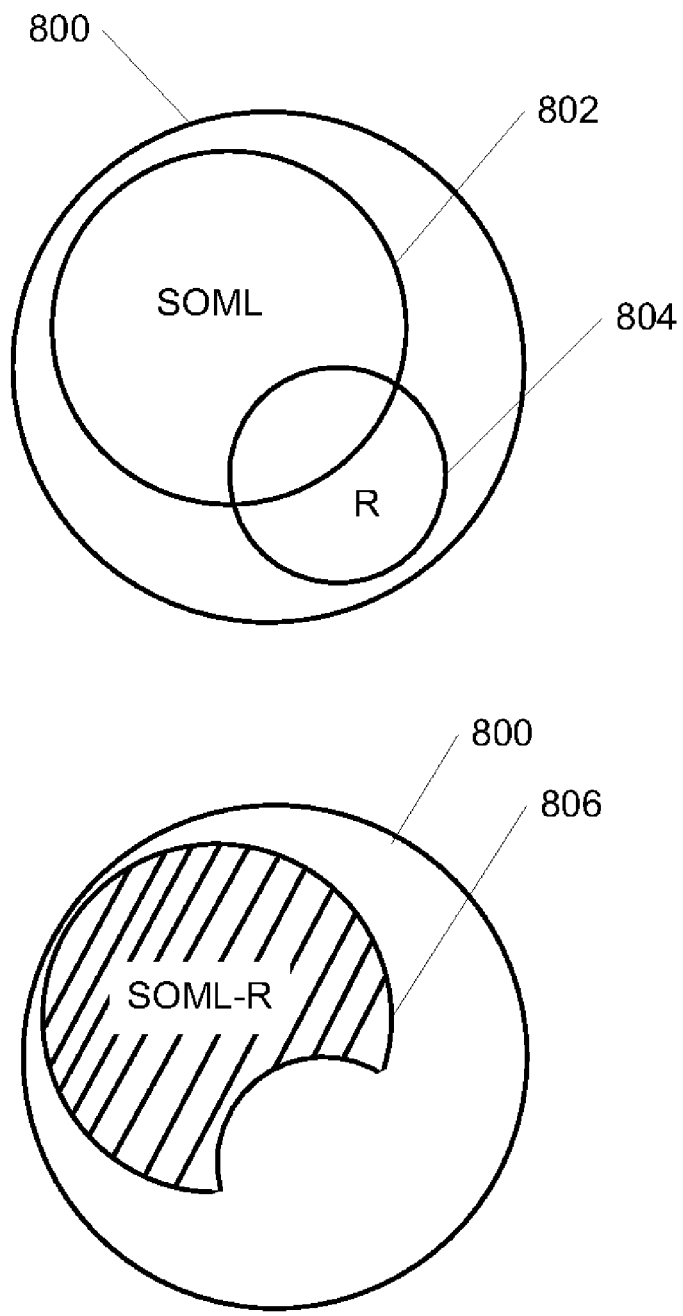
FIG. 8 depicts example configuration rules to illustrate consistency checking operations of the consistency checking system of FIG. 4.

FIG. 8 depicts a visualization of the above consistency error F1 and how sets can be utilized and set routines exercised to determine consistency errors. Configuration space 800 contains a set of all possible feature combinations that could be a part of product. Subset 802 represents a subset of feature combinations that contain main features with one or more S, O, M, and L optionalities. Subset 804 represents a subset of feature combinations containing main features with an R optionality. This grouping of subsets allows consistency checking system 400 to determine the subtraction subset SOML-R 806.

FIG. 9 depicts example configuration rules 900 to illustrate consistency checking operations of the consistency checking system of FIG. 4. Virtually any number of features, optionalities, and constraints can be processed for consistency using consistency checking system 400. Example optionalities include:

L=legally required;
M=mandatory;
NR=not released;
O=optional;
R=restricted; and
S=standard.

Features EN1 and EN2 represent 2 engines from an engine family. Features TR1, TR2, and TR3 represent 3 transmissions from a transmission family. Features AX1, AX2, and AX3 represent 3 axles from an axle family. The rules depicted in FIG. 9 are interpreted as described above. For conciseness, all optionalities are not used in the configuration rules 900 and the examples below, but they can be applied in a data structure and set routines performed in the same manner as the depicted optionalities in the below examples.

FIG. 10 depicts grid 1000 containing the rules of FIG. 9 where AX is the "main family.". From the grid representation to visualize the trie data structures discussed below. Grid 1002 is identical to grid 1000 and illustrates the feature consolidation operation described above and indicated with brackets "[ ... ]". Selections 1008, 1010, 1012, and 1014 are members of the (SOML–R) set, i.e. '={(AX1.EN1.TR1), (AX1.EN1.TR2), (AX2.EN1.TR2), (AX3.EN2.TR2)}. Columns 1002, 1004, and 1006 are members of the [SOML–R] set, i.e. {(EN1.TR1), (EN1.TR2), (EN2.TR2)}.

A description of the four example consistency errors follows with reference to consistency checking operations 500. Errors F1, F2a, and F2b are illustrated below using configuration rules 900. Since configuration rules 900 do not contain an NR optionality, operations involving subsets of NR rules are not presented below. However, the following examples can easily be extrapolated to include NR set operations as well as other set operations utilized by consistency error operations. For example, it will be recognized by those of ordinary skill in the art that any number of other consistency error types can be formulated using set equations, and consistency errors can be detected using the consistency checking system and operations described herein.

FIGS. 11A, 11B, 11C, and 11D depict a use of trie data structures and set routines to determine consistency error F1 within a subset of a configuration space. Consistency error trie [F1] is determined by set routine [F1]=–[SOML–R]. In accordance with operation 504, the consistency checking system 400 identifies the subsets SOML and R. The SMOL trie 1102 represents the set of axle, transmission, and engine feature configurations having a standard, mandatory, optional, or legally required optionality. The R trie 1104 represents the set of axle, transmission, and engine feature configurations that are restricted. Pursuant to operation 506, three binary form trie data structures 1102 represent the SOML subset using the methodology described above in conjunction with FIGS. 6 and 7. The main features are listed at the root of the SOML trie data structures 1102 followed by constraints associated with the main features. Trie data structure 1104 represents the R subset.

To perform a subtraction between trie data structures, consistency checking system 400 determines the complement of the subtrahend trie and performs an intersection between the minuend trie and the subtrahend complement trie. The complement of the subtrahend trie R 1104 is determined by subtracting R trie 1104 from All trie 1106 (i.e. a trie representing all configuration combinations). ¬ R tries 1108 represents the complement of R (also often referred to as "not R"). Operation 508 performs the intersection SOML^¬R.

i.e. the intersection of SOML trie 1102 with ¬ R trie 1108 by subtracting each ¬ R path 1108 from each SOML path 1102. The numbers 1 through 6 illustrate the paths involved in the subtraction operation and the corresponding resulting trie. The six resulting paths in trie 1110 together represent the intersection of SOML^¬ R.

Figure 11A:
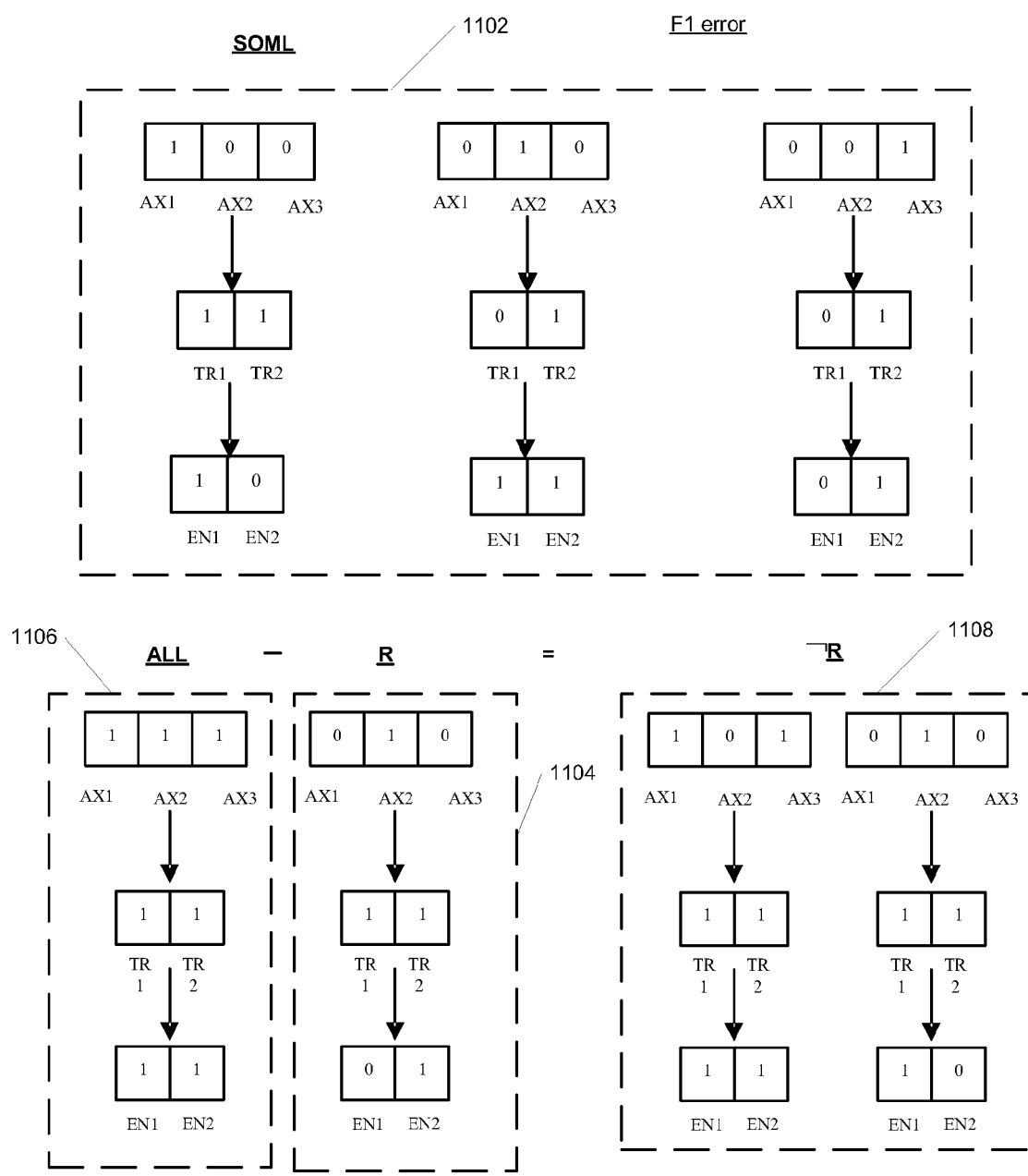
Figure 11C:
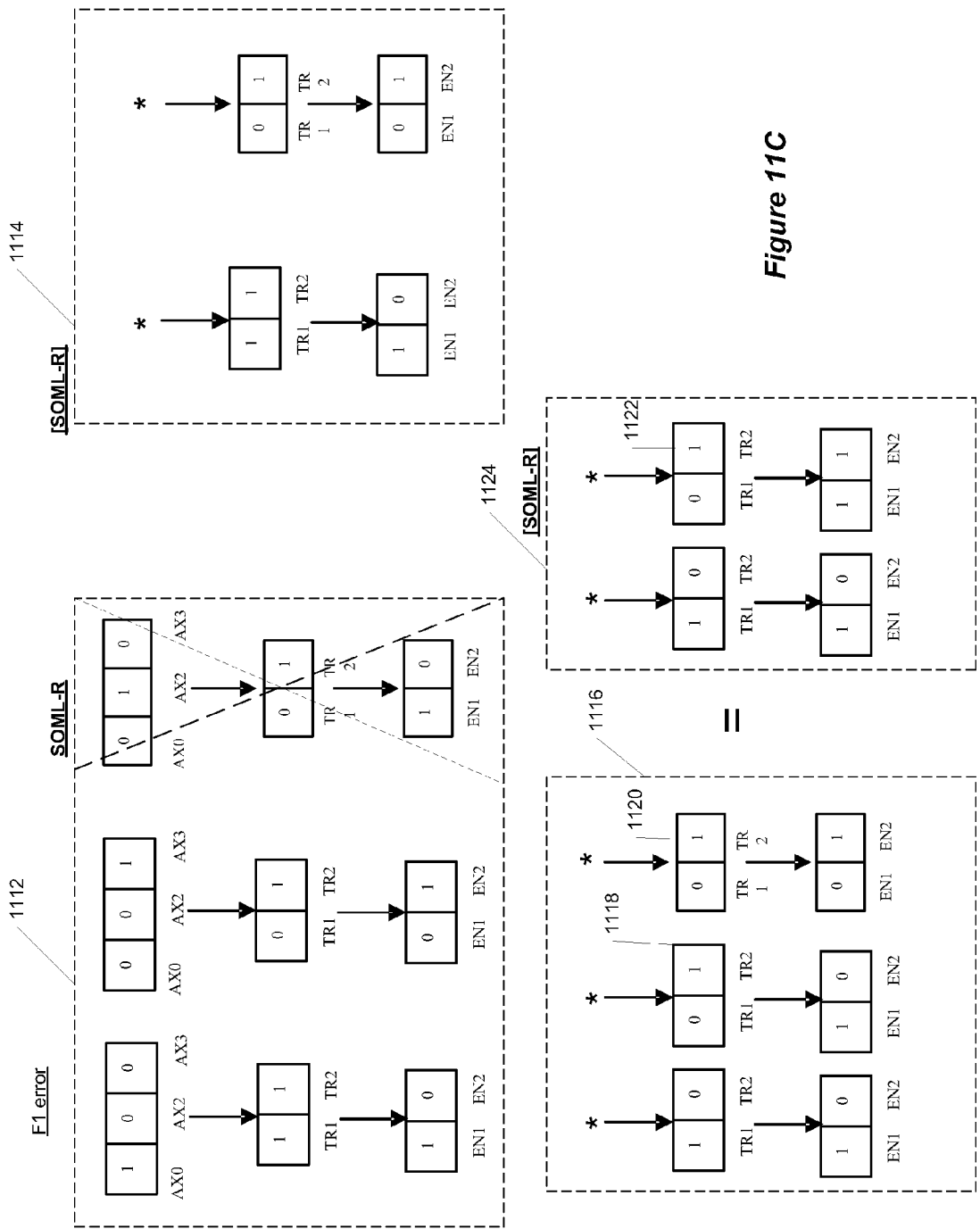
Figure 11D:
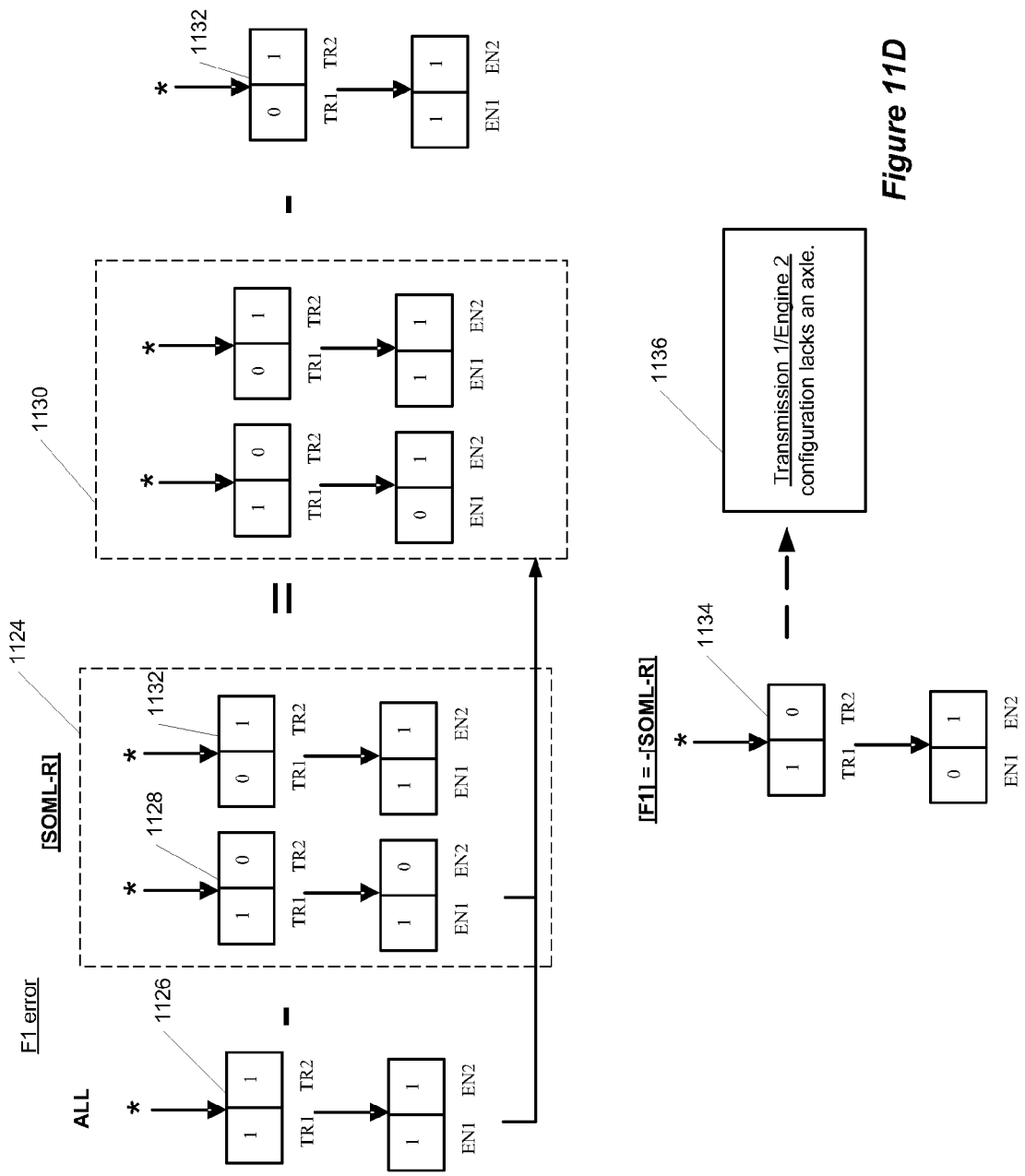

Referring to FIG. 11C, the empty paths of tries 1110 can be discarded, thus reducing trie 1110 to trie 1112. After consolidating the axle level (not shown), two of the three paths of trie 1112 are identical, thus trie 1112 can be reduced to two paths 1114. Furthermore, the main features representing the axles (indicated by the asterisk "*") are consolidated into a smaller subset represented by [SOML–R] trie 1114. [SOML–R] trie 1114 is rearranged into trie 1116 so that the root level of each trie has only one feature represented. In one embodiment, this rearrangement is performed to maintain an invariant required by one embodiment of the specification of the trie data structure, i.e. no node is allowed to have immediate children with overlapping sets. In this case the * node has children 11 and 01, which overlap. Tries 1118 and 1120 can be minimized to form trie 1122, which results in [SOML–R] trie 1124.

As discussed above, subtracting [SOML–R] trie 1124 from an ALL trie 1126 determines the complement of [SOML–R] trie 1124. First subtracting path 1128 from ALL trie 1126 and then subtracting path 1132 from the result produces –[SOML–R], i.e. the complement of [SOML–R]. Subtracting path 1128 from ALL trie 1126 produces paths 1130, and subtracting path 1132 from paths 1130 produces –[SOML–R] trie 1134. The –[SOML–R] trie 1134 represents the configuration of TR1 (transmission 1) and EN2 (engine 2). Thus, consistency checking system 400 correctly determines that consistency error F1=–[SOML–R] 1136 is that the combination of Transmission 1 and Engine 2 lacks an axle. Operation 510 displays/reports the F1 consistency error.

Figure 12:
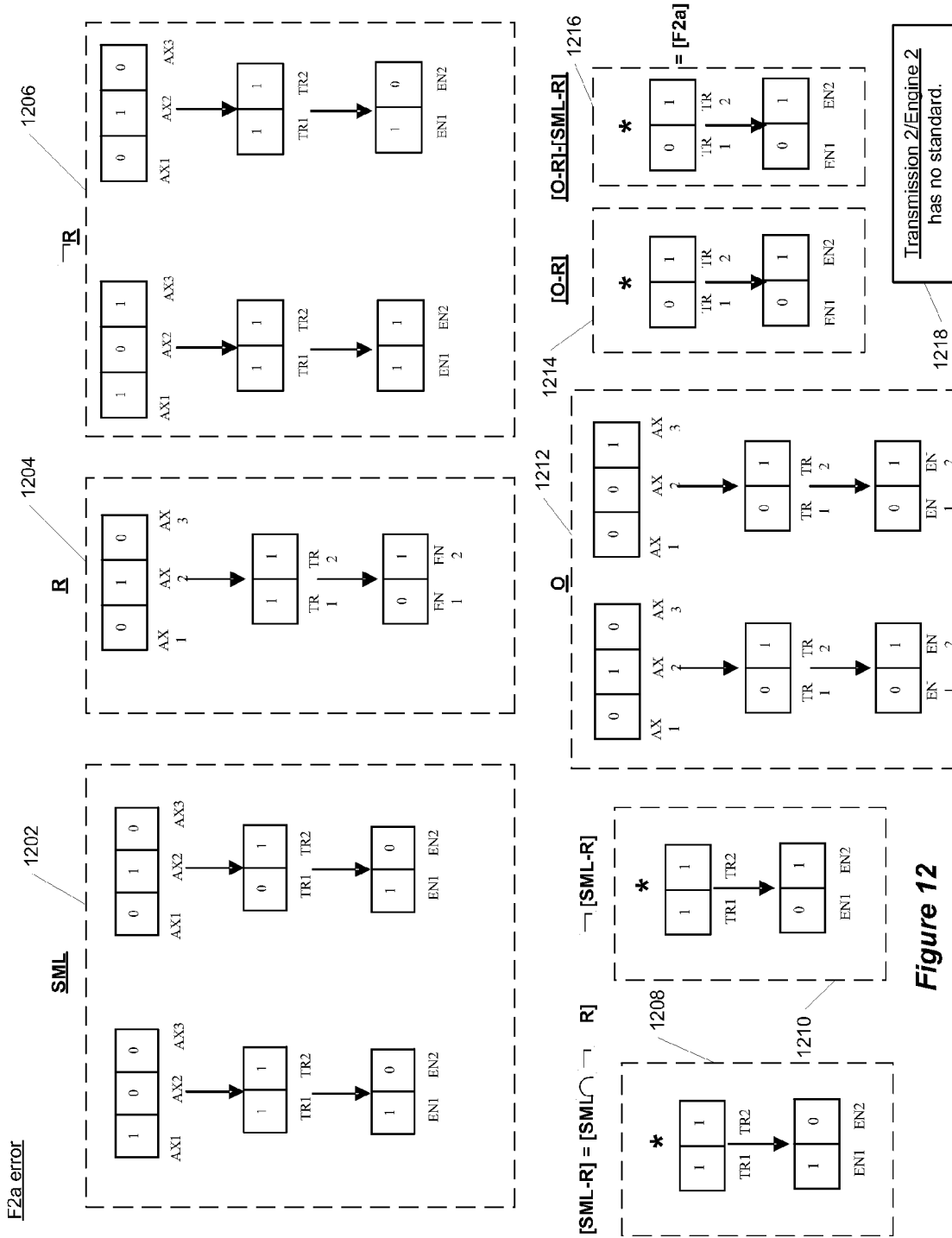
FIG. 12 depicts a use of trie data structures and set routines to determine a consistency error when a usage rule is present, a standard optionality is required, and no standard optionality is present.

FIG. 12 depicts a use of trie data structures and set routines by consistency checking system 400 in accordance with consistency checking operations 500 to determine a consistency error when a usage rule is present, a standard optionality is required, and no standard optionality is present. Consistency error trie [F2a] is determined by set routine [F2a]=([O–R]–[SML–R]) pursuant to operation 504. Operation 506 generates the following trie data structures, operation 508 performs the set math routines in the manner discussed with reference to FIG. 11.

The SML trie 1202 represents axle, transmission, and engine configurations having a standard, mandatory, or legally required optionality. The R trie 1204 represents axle, transmission, and engine configurations that are restricted. The intersection of SML trie and ¬R trie 1206 and consolidation of the main family features (axles) results in [SML–R] trie 1208. The –[SML–R] trie 1210 represents the complement of [SML–R] trie 1208. The O trie 1212 represents transmission and engine constraints on the axle family having an 'optional' optionality. The [O–R] trie 1214 represents the set of transmission and engine constraints on the axle family having an 'optional' optionality less the set of transmission and engine constraints on the axle that are restricted. The [O–R]–[SML–R] trie represents the consistency error trie [F2a]. The consistency error is correctly identified and reported as the configuration rules that include transmission 2 and engine 2 constraints on the axle family have no standard.

Figure 13:
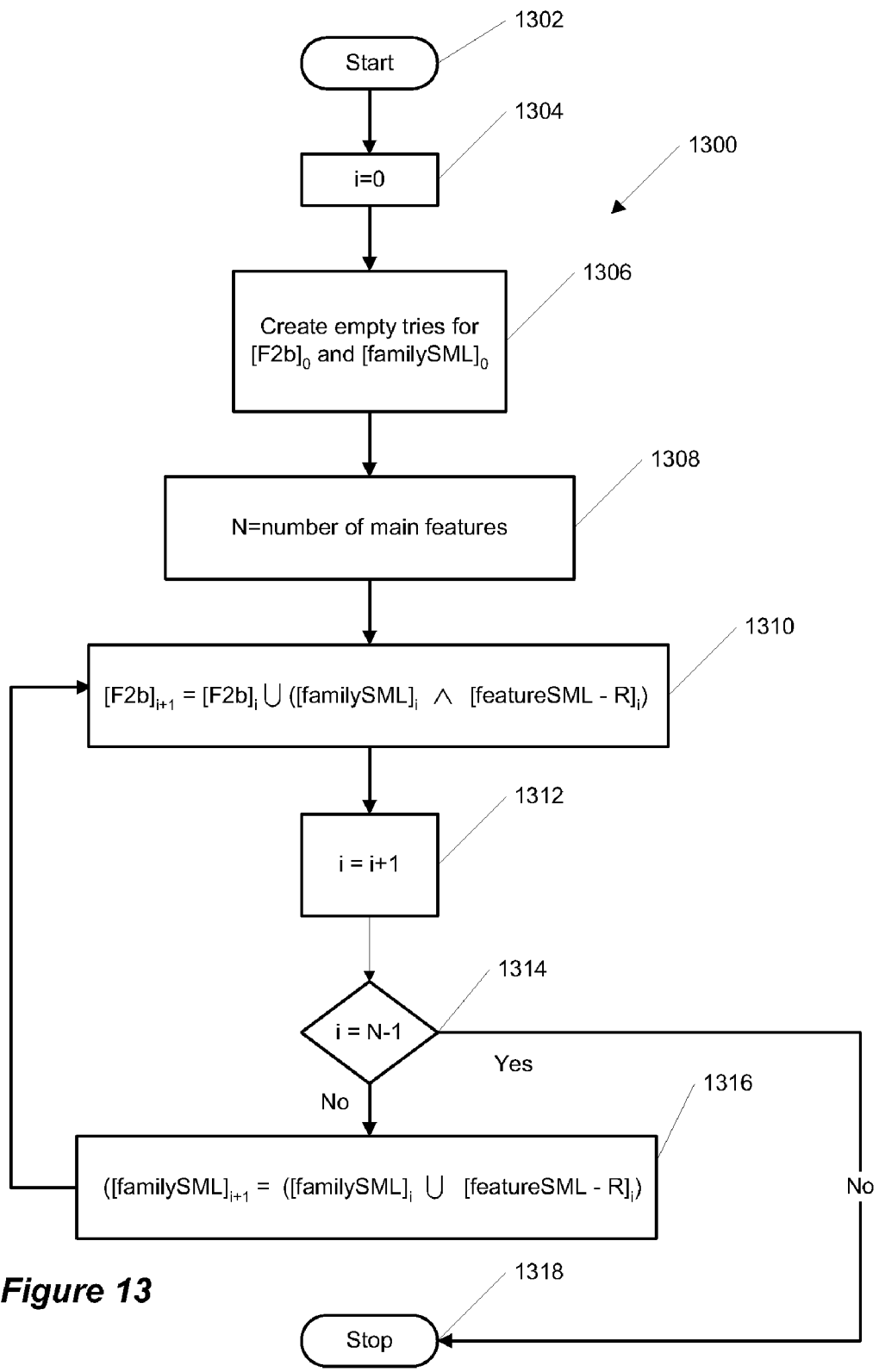
FIG. 13 depicts an operational flow chart to determine a consistency error indicating the existence of multiple standards for a subset of configuration rules.

FIG. 13 depicts a flow chart of multiple standard consistency error operation 1300 to determine an F2b consistency error indicating the existence of multiple standards for a subset of configuration rules. Consistency error operational flow chart 1300 progresses along each row of main features in configuration rules 900, identifies a subsets of standards, and compares the subsets of standards for previous identified standards. An F2b consistency error exists when there are multiple standards in configuration rules 900.

FIGS. 14A, 14B, 14C, 14D, and 14E (collectively "FIG. 14") depict a use of trie data structures and set routines to determine a consistency error indicating the existence of multiple standards for a subset of configuration rules. Referring to FIGS. 13 and 14, operation 1300 begins with operation 1302 and proceeds to set a counter variable, i, to 0. Operation 1306 creates an empty set for tries $[F2b]_0$ 1402 and $[familySML]_0$ 1404. Operation 1308 sets the variable, N, equal to the number of main features in configuration rules 900, which equals three in this embodiment, i.e. AX1, AX2, and AX3. In operation 1310, consistency error trie $[F2b]_{i+1} = [F2b]_i \cup ([familySML]_i \char`\^ [featureSML-featureR]_i)$. Trie $[featureSML-featureR]_0$ is minimized trie 1408 by eliminating the empty set trie 1407 and consolidating the main feature level. Trie 1500 represents the intersection of tries $[familySML]_0$ 1404 and $[featureSML-featureR]_0$ 1408. The union ("U") of trie $[F2b]_0$ and trie 1500 produces trie $[F2b]_1$ 1502.

Figure 14A:
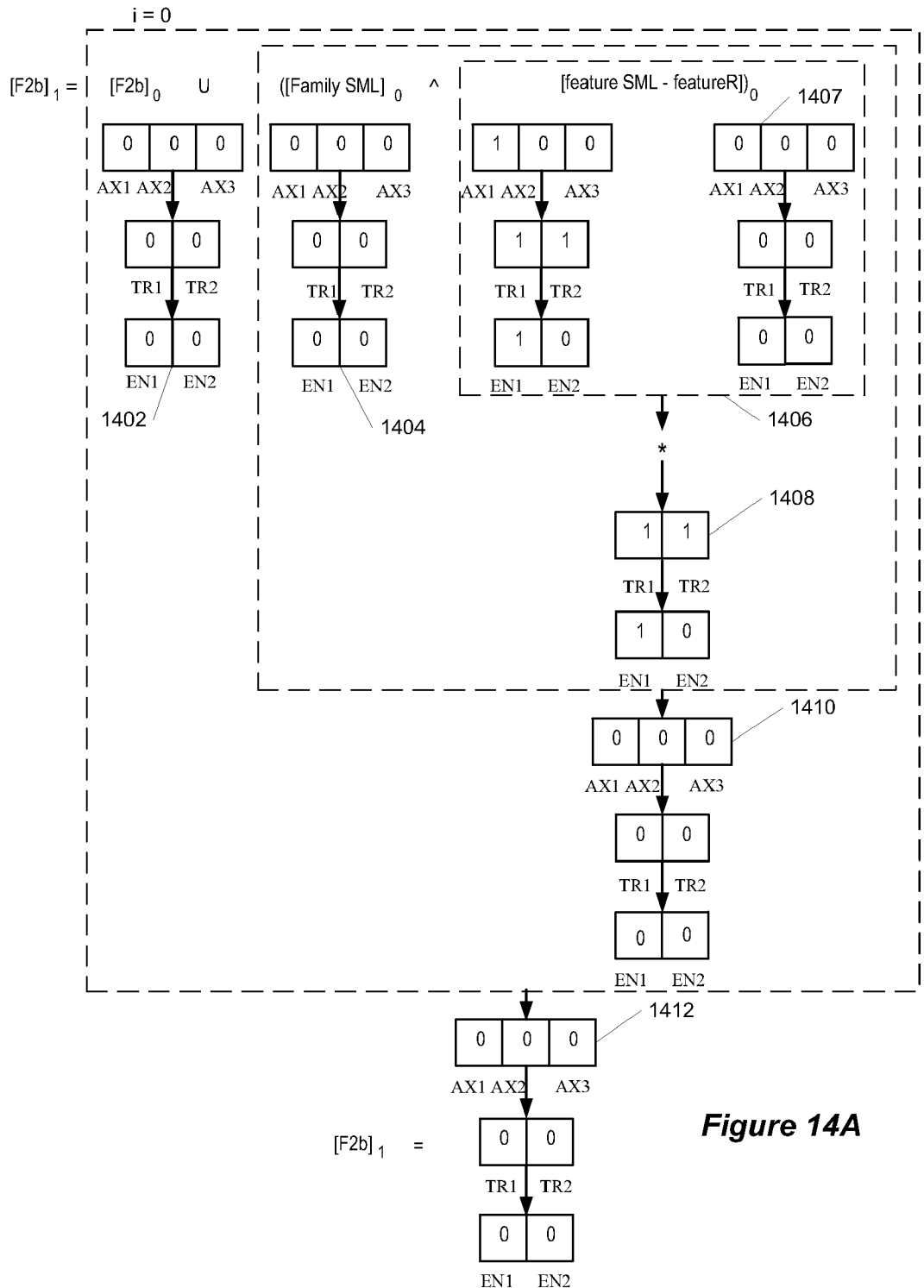
FIGS. 14A, 14B, 14C, 14D, and 14E depict a use of trie data structures and set routines to determine a consistency error indicating the existence of multiple standards for a subset of configuration rules.
Figure 14B:
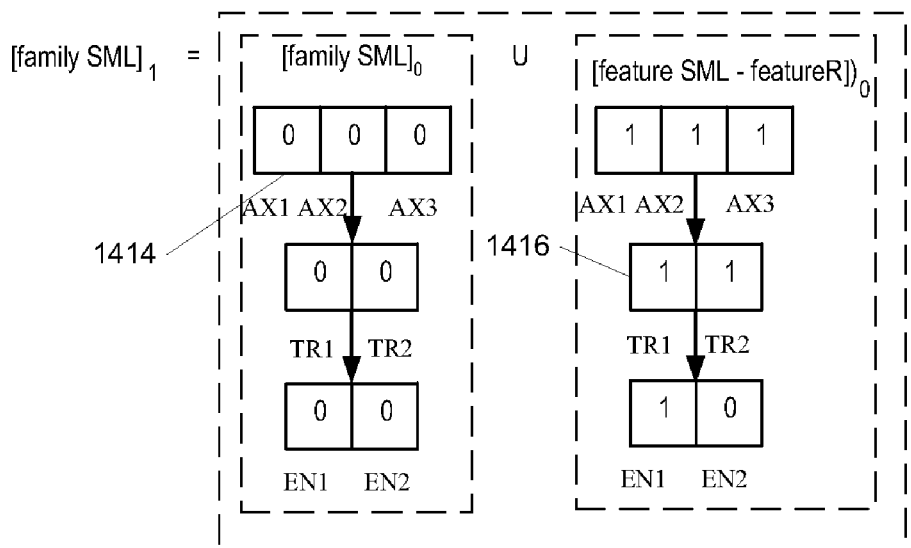
Figure 14B:
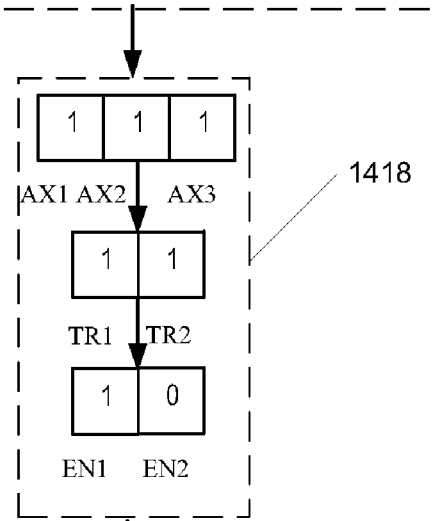
Figure 14B:
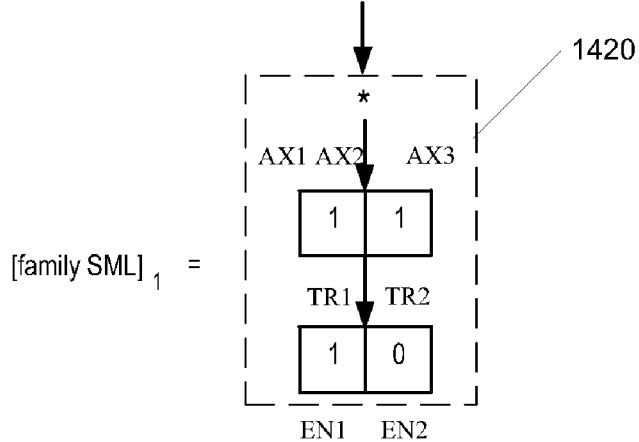
Figure 14C:
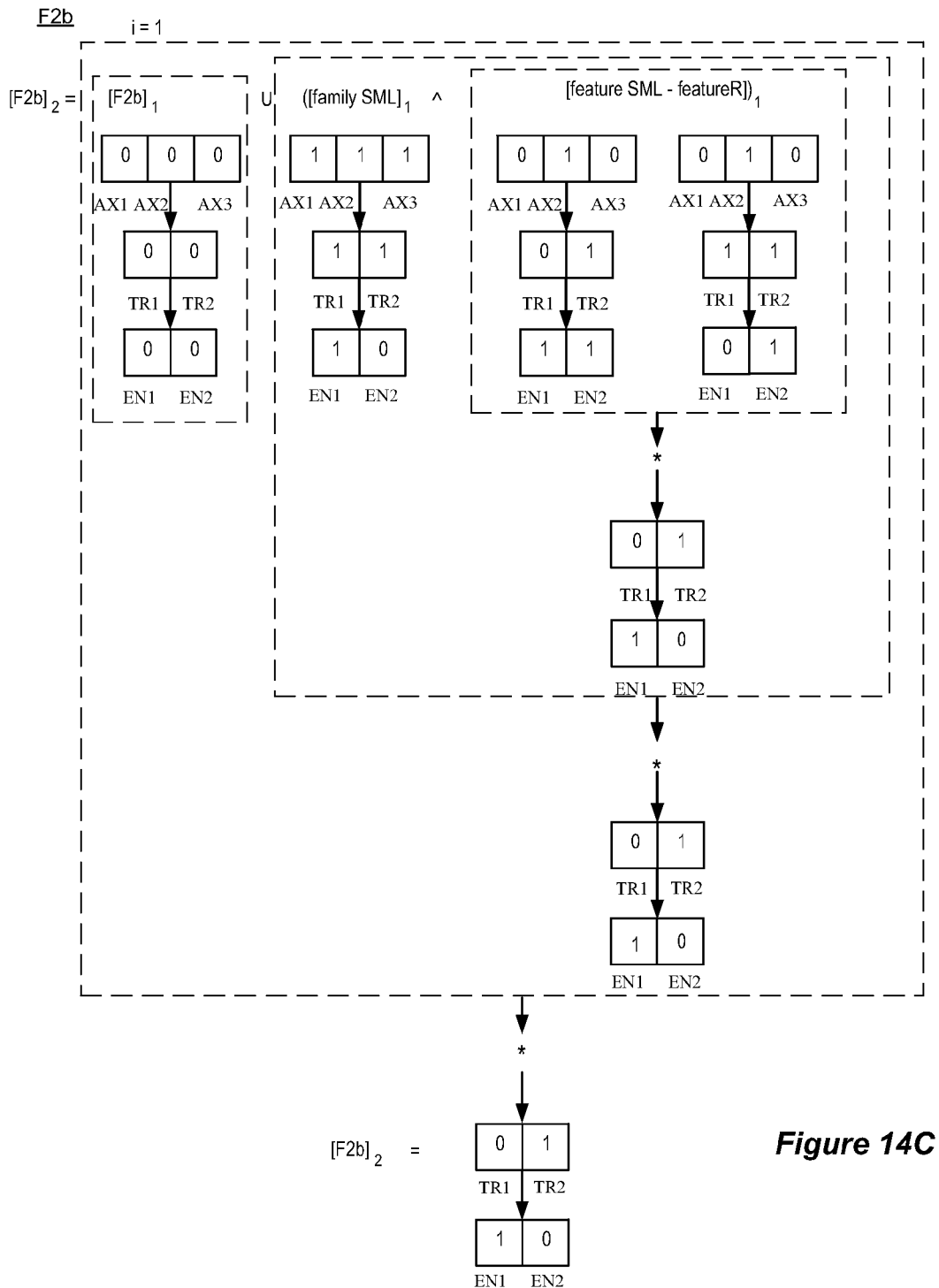
Figure 14D:
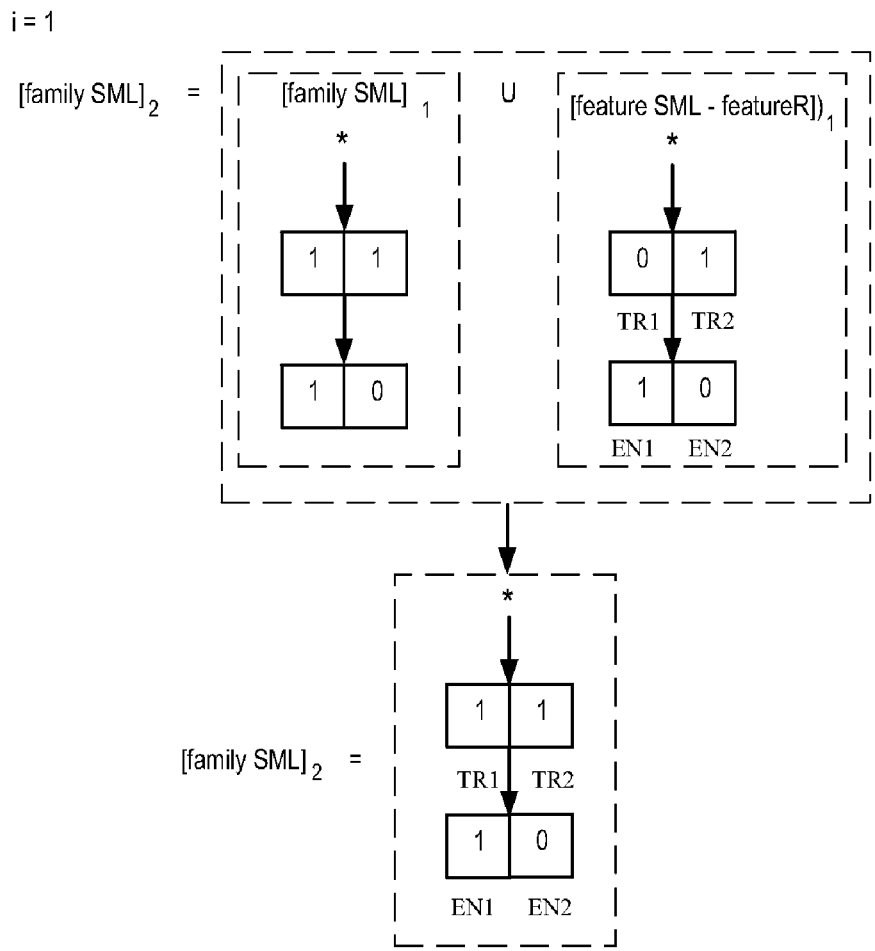
Figure 14E:
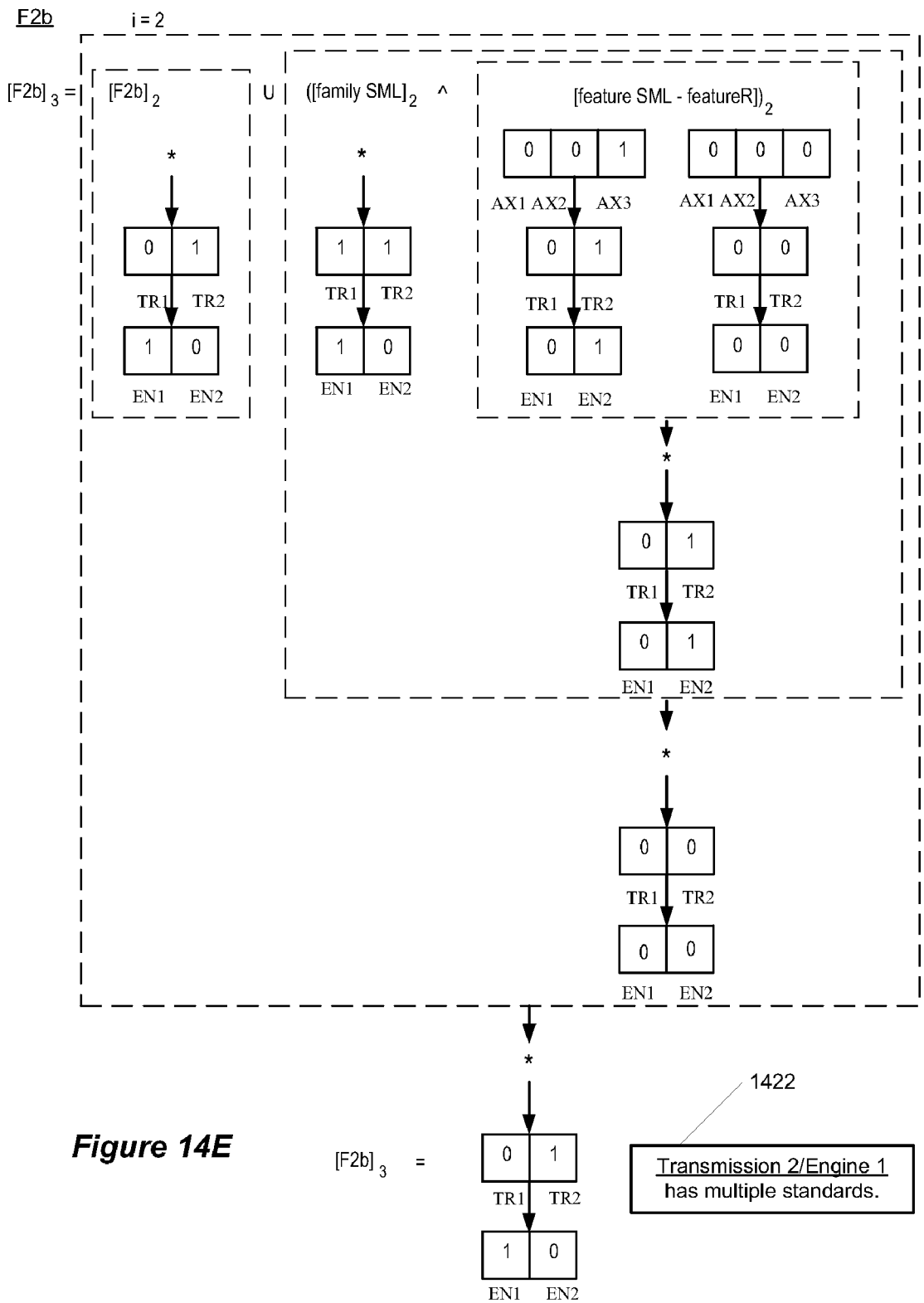

Referring to FIGS. 13 and 14B, operation 1312 increments i by 1, and operation 1314 determines whether i=N. If i=N, then operation 1300 stops at operation 1318 with the trie $[F2b]_N$ representing the consistency error. Since at this stage, i=1, operation 1300 proceeds to operation 1316 to determine $([familySML]_{i+1} = ([familySML]_i \cup [featureSML-featureR]_i)$. The union of tries $[familySML]_0$ 1504 and $[featureSML-featureR]_0$ 1506 produces $(familySML)_1$ trie 1508, which becomes trie 1510 with consolidation of the main family features. Operation 1300 returns to operation 1310 and proceeds as discussed above until i=3. FIGS. 14C, 14D, and 14E depict the resulting tries and trie operation results through i=3. The $[F2b]_3$ trie represents the multiple standards consistency error trie $[F2a]$. The consistency error 1422 is correctly identified and reported as the transmission 2/engine 1 configuration has multiple standards.

FIG. 15 depicts example configuration rules 1500 to illustrate consistency checking operations of the consistency checking system of FIG. 4 when determining a consistency error that occurs when mandatory or legal optionalities conflict with an "optional" optionality. Configuration rules 1500 differ from configuration rules 9 by including a configuration rule {AX1 M EN2.TR2}. FIG. 16 depicts a grid containing the rules of FIG. 15 where AX is the main family.

Figure 17A:
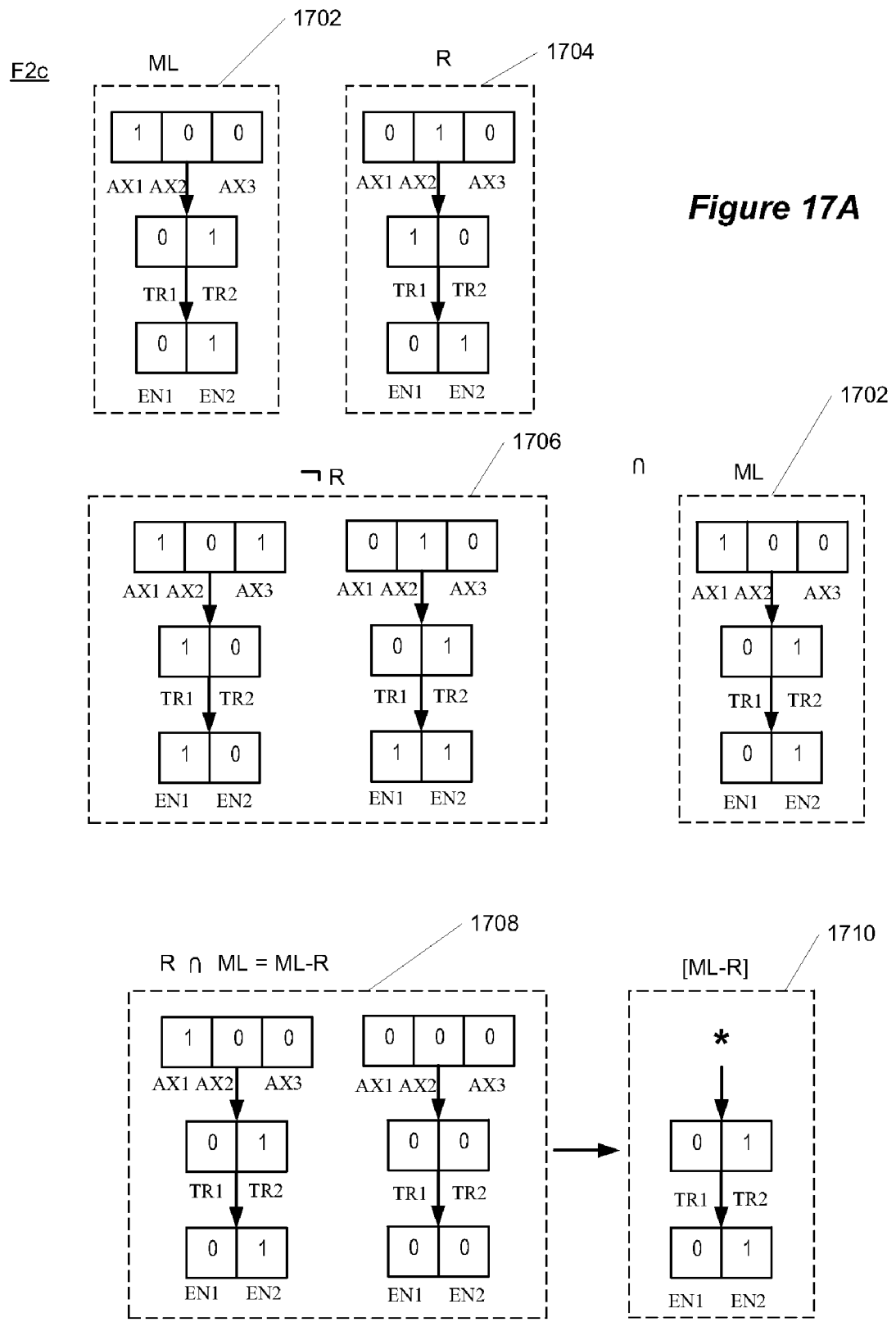
FIGS. 17A, 17B, and 17C depict a use of trie data structures and set routines to determine a consistency error that occurs when mandatory or legal optionalities conflict with an "optional" optionality.
Figure 17B:
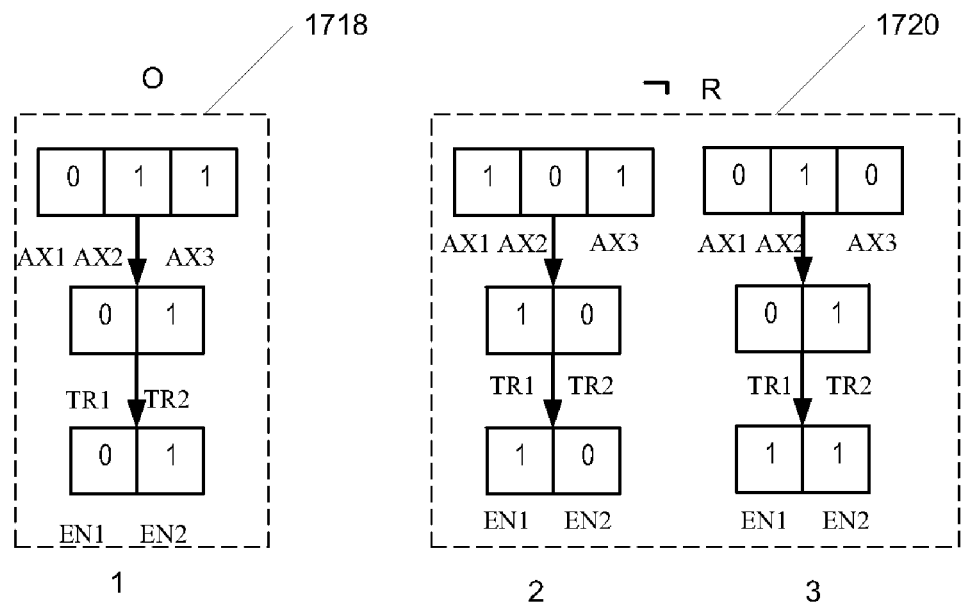
Figure 17B:
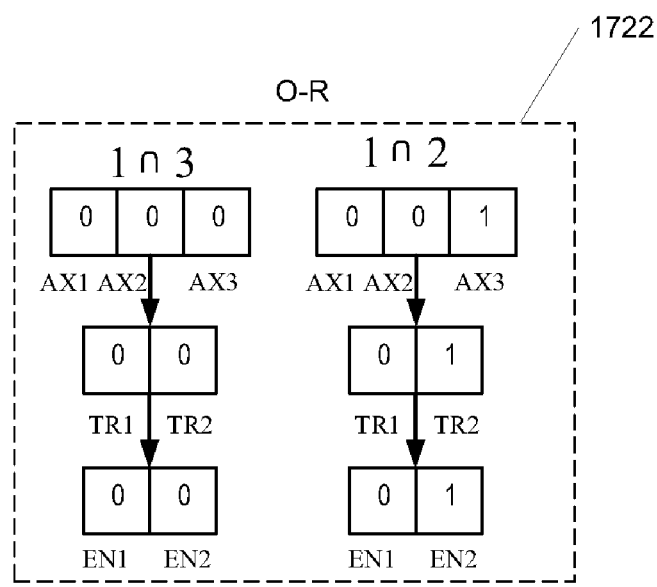
Figure 17C:
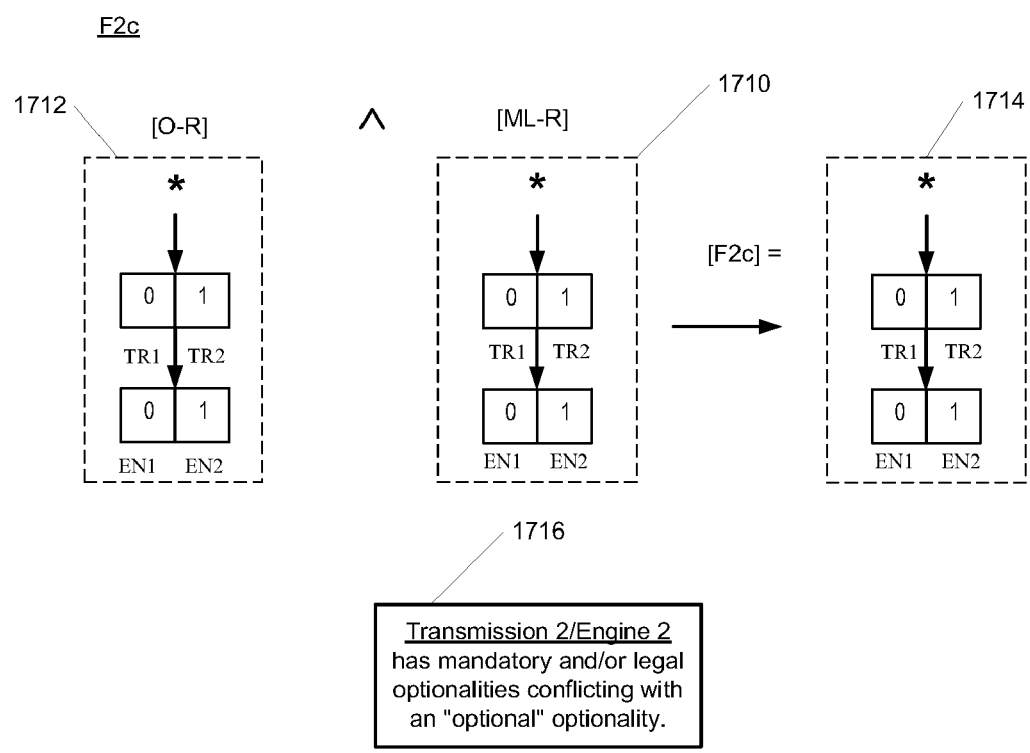

FIGS. 17A, 17B, and 17C (collectively "FIG. 17") depict a use of trie data structures and set routines to determine a consistency error that occurs when mandatory or legal optionalities conflict with an "optional" optionality. Consistency error trie $[F2c]$ is determined by set routine $[F2c] = ([ML-R] \char`\^ [O-R])$ pursuant to operation 504. Operation 506 generates the following trie data structures, operation 508 performs the set math routines in the manner discussed with reference to FIG. 17.

The ML trie 1702 represents axle, transmission, and engine configurations having mandatory or legally required optionalities. The R trie 1704 represents axle, transmission, and engine configurations that are restricted. The intersection of ML trie 1702 and ¬R trie 1706 results in (ML-R) trie 1708. The consolidation of the main family features (axles) results in [ML-R] trie 1710 The [O-R] trie 1712 represents the set of transmission and engine constraints on the axle family having an 'optional' optionality less the set of transmission and engine constraints on the axle that are restricted. (O) Trie 1718 represents the set features in grid with 'optional' optionalities, and trie ¬R 1720 includes two paths representing features in grid 1600 with restriction optionalities. (O-R) trie 1722 represents the subtraction of each path of (-R) trie 1720 from (O) trie 1718. The $[F2c] = [O-R] \char`\^ [ML-R]$ 1714 trie represents the consistency error trie $[F2c]$, which indicates a consistency error 1716 with configuration rules 1500. Specifically, the transmission 2 and engine 2 constraints on the axle family have conflicting legal and/or mandatory optionalities with an "optional" optionality.

Thus, consistency checking system 400 determines consistency errors in configuration rules efficiently by operating on subsets of data that are particularly applicable to the consistency error being checked. Furthermore, specific set operations and data structures have been identified to perform the consistency checks.

Figure 18:
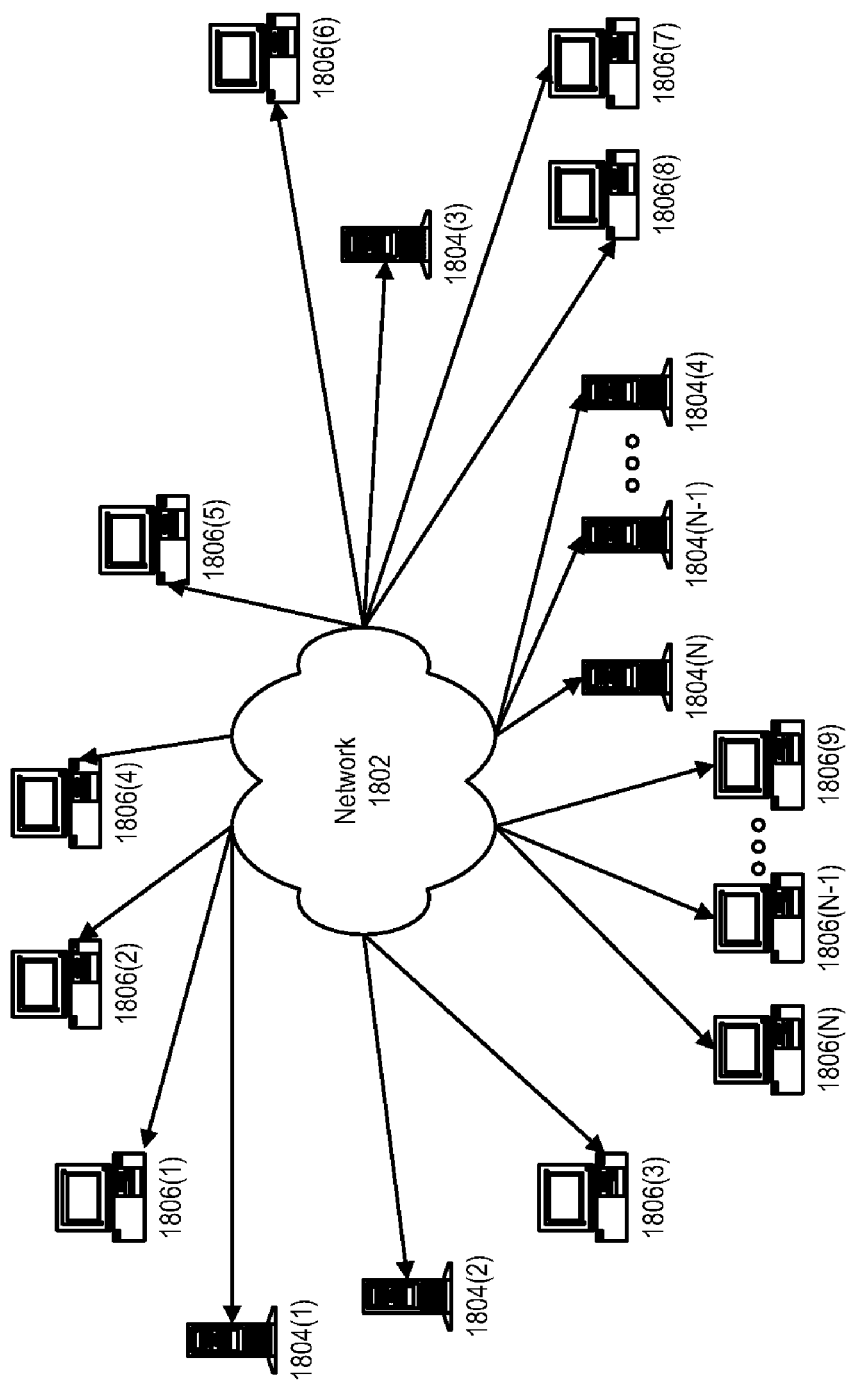
FIG. 18 depicts a block diagram depicting a network environment in which a consistency checking system may be practiced.

FIG. 18 is a block diagram depicting one embodiment of a network environment in which a consistency checking system 400 may be practiced. Network 1802 (e.g. a private wide area network (WAN) or the Internet) includes a number of networked server computer systems 1804(1)-(N) that are accessible by client computer systems 1806(1)-(N), where N is the number of server computer systems connected to the network. Communication between client computer systems 1806(1)-(N) and server computer systems 1804(1)-(N) typically occurs over a network, such as a public switched telephone network over asynchronous digital subscriber line (ADSL) telephone lines or high-bandwidth trunks, for example communications channels providing T1 or OC3 service. Client computer systems 1806(1)-(N) typically access server computer systems 1804(1)-(N) through a service provider, e.g., an Internet service provider such as America On-Line™ and the like, by executing application specific software, commonly referred to as a browser, on one of client computer systems 1806(1)-(N).

Client computer systems 1806(1)-(N) and/or server computer systems 1804(1)-(N) may be, for example, computer systems of any appropriate design, including a mainframe, a mini-computer, a personal computer system, or a wireless, mobile computing device. These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as hard disks, CD-ROM drives and magneto-optical drives may also be provided, either as an integrated or peripheral device. One such example computer system is shown in detail in FIG. 19.

Figure 19:
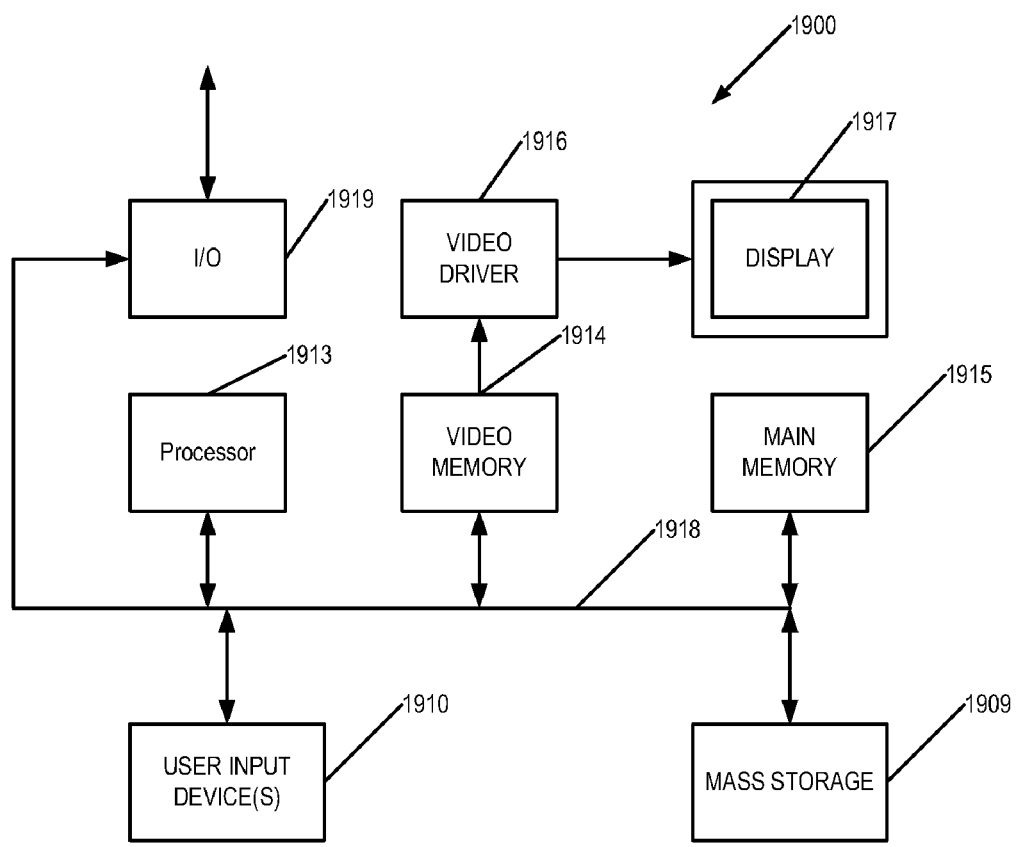
FIG. 19 depicts a computer system.

Embodiments of the consistency checking system 400 can be implemented on a computer system such as a general-purpose computer 1900 depicted in FIG. 19. Input user device (s) 1910, such as a keyboard and/or mouse, are coupled to a bi-directional system bus 1918. The input user device(s) 1910 are for introducing user input to the computer system and communicating that user input to processor 1913. The computer system of FIG. 19 also includes a video memory 1914, main memory 1915 and mass storage 1909, all coupled to bi-directional system bus 1918 along with input user device (s) 1910 and processor 1913. The mass storage 1909 may include both fixed and removable media, such as other available mass storage technology. Bus 1918 may contain, for example, 32 address lines for addressing video memory 1914 or main memory 1915. The system bus 1918 also includes, for example, an n-bit DATA bus for transferring DATA between and among the components, such as CPU 1909, main memory 1915, video memory 1914 and mass storage 1909, where "n" is, for example, 32 or 64. Alternatively, multiplex DATA/address lines may be used instead of separate DATA and address lines.

I/O device(s) 1919 may provide connections to peripheral devices, such as a printer, and may also provide a direct connection to remote server computer systems via a telephone link or to the Internet via an internet service provider (ISP). I/O device(s) 1919 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 1909 until loaded into main memory 1915 for execution. Computer programs may also be in the form of electronic signals modulated in accordance with the computer program and data communication technology when transferred via a network. The method and functions relating to consistency checking system 400 may be implemented in a computer program alone or in conjunction with hardware.

The processor 1913, in one embodiment, is a 32-bit microprocessor manufactured by Motorola or microprocessor manufactured by Intel, such as the Pentium processor. However, any other suitable single or multiple microprocessors or microcomputers may be utilized. Main memory 1915 is comprised of dynamic random access memory (DRAM). Video memory 1914 is a dual-ported video random access memory. One port of the video memory 1914 is coupled to video amplifier 1918. The video amplifier 1918 is used to drive the display 1919. Video amplifier 1918 is well known in the art and may be implemented by any suitable means. This circuitry converts pixel DATA stored in video memory 1914 to a raster signal suitable for use by display 1919. Display 1919 is a type of monitor suitable for displaying graphic images.

The computer system described above is for purposes of example only. The consistency checking system 400 may be implemented in any type of computer system or programming or processing environment. It is contemplated that the consistency checking system 400 might be run on a standalone computer system, such as the one described above. The consistency checking system 400 might also be run from a server computer systems system that can be accessed by a plurality of client computer systems interconnected over an intranet network. Finally, the consistency checking system 400 may be run from a server computer system that is accessible to clients over the Internet.

Many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it should be understood that various changes, substitutions and alterations can be made hereto without departing from the spirit and scope of the invention as defined by the appended claims.

What is claimed is:

1. A method of detecting consistency errors for multiple consistency error types between configuration rules, the method comprising:

for each consistency error type, wherein each consistency error type is represented by a 'set' equation:

identifying one or more sets of feature combinations in accordance with the set equation of the consistency error type in which a particular type of consistency error can occur;

if a consistency error of the consistency error type exists in the one or more sets of feature combinations, detecting the consistency error using the one or more identified sets of feature combinations and the set equation associated with the consistency error type; and providing data, to a computer system for display by a display device, wherein the data indicates any detected consistency error.

2. The method of claim 1 wherein the configuration rules includes features, optionalities, and constraints, and each set equation includes sets of features grouped by selected optionalities.

3. The configuration method of claim 2 wherein optionalities include mandatory, standard, optional, and restricted.

4. The method of claim 1 wherein detecting the consistency error using the one or more identified sets of feature combinations and the set equation associated with the consistency error type further comprises:

performing set math routines in accordance with the set equation associated with the consistency error type on the identified one or more sets of feature combinations to detect any consistency error in the one or more sets of feature combinations.

5. The method of claim 1 further comprising:

generating a trie data structure having levels and nodes to represent the features in the configuration rules, wherein each family is represented in a distinct level of the trie data structure and each respective feature representation is represented by a single node.

6. The method of claim 1 wherein the set equation includes a representation of an inclusion of subsets of features of a family of features associated with a first one or more optionalities and removal of subsets of features of the family of features associated with a second one or more optionalities.

7. The method of claim 1 wherein a configuration space represents a plurality of feature combinations and identifying one or more sets of feature combinations in accordance with the set equation of the consistency error type further comprises:

determining a portion of feature combinations of the configuration space in which a consistency error can occur.

8. The method of claim 1 wherein identifying one or more sets of feature combinations in accordance with the set equation of the consistency error type further comprises:

consolidating the feature combinations into minimized subsets that represent the portion of the configuration space where the consistency error can occur.

9. A consistency checking system for detecting consistency errors for multiple consistency error types between configuration rules, the system comprising:

a processor;

a memory, coupled to the processor, having instructions executable by the processor for:

for each consistency error type, wherein each consistency error type is represented by a 'set' equation:

identifying one or more sets of feature combinations in accordance with the set equation of the consistency error type in which a particular type of consistency error can occur;

if a consistency error of the consistency error type exists in the one or more sets of feature combinations, detecting the consistency error using the one or more identified sets of feature combinations and the set equation associated with the consistency error type;

providing data, to a computer system for display by a display device, wherein the data indicates any detected consistency error.

10. The configuration consistency checking system of claim 9 further comprising:

a trie data structure having levels and nodes to represent the feature combinations in the configuration rules, wherein each family is represented in a distinct level of the trie data structure and each respective feature representation is represented by a single node.

11. The consistency checking system of claim 9 wherein the configuration rules includes features, optionalities, and constraints, and each set equation includes sets of features grouped by selected optionalities.

12. The consistency checking system of claim 11 wherein optionalities include mandatory, standard, optional, and restricted.

13. The consistency checking system of claim 9 wherein the instructions for detecting the consistency error using the one or more identified sets of feature combinations and the set equation associated with the consistency error type further comprise instructions for:

performing set math routines in accordance with the set equation associated with the consistency error type on the identified one or more sets of feature combinations to detect any consistency error in the one or more sets of feature combinations.

14. The consistency checking system of claim 9 wherein the memory further comprises instructions executable by the processor for:

generating a trie data structure having levels and nodes to represent the features in the configuration rules, wherein each family is represented in a distinct level of the trie data structure and each respective feature representation is represented by a single node.

15. The consistency checking system of claim 9 wherein a configuration space represents a plurality of feature combinations and the instructions for identifying one or more sets of feature combinations in accordance with the set equation of the consistency error type further comprise instructions for:

determining a portion of feature combinations of the configuration space in which a consistency error can occur.

16. The consistency checking system of claim 9 wherein the instructions for identifying one or more sets of feature combinations in accordance with the set equation of the consistency error type further comprise instructions for:

consolidating the feature combinations into minimized subsets that represent the portion of the configuration space where the consistency error can occur.

17. A computer readable medium having code stored therein to detect consistency errors for multiple consistency error types between configuration rules, wherein the code is executable by a processor for:

for each consistency error type, wherein each consistency error type is represented by a 'set' equation:

identifying one or more sets of feature combinations in accordance with the set equation of the consistency error type in which a particular type of consistency error can occur;

if a consistency error of the consistency error type exists in the one or more sets of feature combinations, detecting the consistency error using the one or more identified sets of feature combinations and the set equation associated with the consistency error type; and providing data, to a computer system for display by a display device, wherein the data indicates any detected consistency error.

18. The readable medium product of claim 17 further comprising code stored therein and executable by the processor for:

organizing the one or more sets of feature combinations into a trie data structure having levels and nodes to represent the features in the configuration rules, wherein each family is represented in a distinct level of the trie data structure and each respective feature representation is represented by a single node.

19. The computer readable medium of claim 17 wherein the configuration rules includes features, optionalities, and constraints, and each set equation includes sets of features grouped by selected optionalities.

20. The computer readable medium of claim 19 wherein optionalities include mandatory, standard, optional, and restricted.

21. The computer readable medium of claim 17 wherein the code for detecting the consistency error using the one or more identified sets of feature combinations and the set equation associated with the consistency error type further comprises code for:

performing set math routines in accordance with the set equation associated with the consistency error type on the identified one or more sets of feature combinations to detect any consistency error in the one or more sets of feature combinations.

22. The computer readable medium of claim 17 further comprising code stored therein and executable by the processor for:

organizing the one or more sets of feature combinations into a trie data structure having levels and nodes to represent the features in the configuration rules, wherein each family is represented in a distinct level of the trie data structure and each respective feature representation is represented by a single node.

23. The computer readable medium of claim 17 wherein a configuration space represents a plurality of feature combinations and the code for identifying one or more sets of feature combinations in accordance with the set equation of the consistency error type further comprises code for:

determining a portion of feature combinations of the configuration space in which a consistency error can occur.

24. The computer readable medium of claim 17 wherein the code for identifying one or more sets of feature combinations in accordance with the set equation of the consistency error type further comprises code for:

consolidating the feature combinations into minimized subsets that represent the portion of the configuration space where the consistency error can occur.

25. A computer implemented method for detecting one or more consistency errors for a consistency error type between configuration rules, wherein a configuration space represents a set of combinations of feature selections allowed by the configuration rules, the method comprising:

consolidating a portion of the feature combinations within the configuration space into one or more minimized subsets of feature combinations that represent a portion of the configuration space where a particular type of consistency error can occur;

performing set routines on the one or minimized subset of feature combinations in accordance with a 'set' equation associated with the particular type of consistency error;

if a consistency error of the consistency error type exists in the one or more sets of feature combinations, detecting the consistency error in the one or more minimized subsets of feature combinations using the set equation associated with the consistency error; and providing data indicating any detected consistency error.

26. The method of claim 25 further comprising:

generating a trie data structure having levels and nodes to represent the feature combinations in the configuration rules, wherein each family is represented in a distinct level of the trie data structure and each respective feature representation is represented by a single node.

27. The method of claim 25 wherein detecting the consistency error using the one or more identified sets of feature combinations and the set equation associated with the consistency error type further comprises:

performing set math routines in accordance with the set equation associated with the consistency error type on the identified one or more sets of feature combinations to detect any consistency error in the one or more sets of feature combinations.

* * * * *